US012591311B2

(12) United States Patent
Moussette et al.

(10) Patent No.: US 12,591,311 B2
(45) Date of Patent: **\*Mar. 31, 2026**

(54) ELECTRONIC DEVICES WITH TOUCH INPUT COMPONENTS AND HAPTIC OUTPUT COMPONENTS

(71) Applicant: Apple Inc., Cupertino, CA (US)

(72) Inventors: Camille Moussette, San Francisco, CA (US); James H. Foster, Oxford (GB); Duncan Kerr, San Francisco, CA (US); Adam S. Meyer, Cupertino, CA (US); Per Haakan Linus Persson, San Francisco, CA (US); Peter C. Tsoi, San Mateo, CA (US); Stuart J. Wood, London (GB)

( \* ) Notice: Subject to any disclaimer, the term of this patent is extended or adjusted under 35 U.S.C. 154(b) by 0 days.

This patent is subject to a terminal disclaimer.

(21) Appl. No.: 18/798,318

(22) Filed: Aug. 8, 2024

(65) Prior Publication Data

US 2024/0393881 A1     Nov. 28, 2024

Related U.S. Application Data

(63) Continuation of application No. 18/167,762, filed on Feb. 10, 2023, now Pat. No. 12,073,025, which is a
(Continued)

(51) Int. Cl.
*G06F 3/01* (2006.01)
*G06F 1/16* (2006.01)
(Continued)

(52) U.S. Cl.
CPC ............ *G06F 3/016* (2013.01); *G06F 1/1643* (2013.01); *G06F 3/0412* (2013.01); *G06F 3/044* (2013.01)

(58) Field of Classification Search
None
See application file for complete search history.

(56) References Cited

U.S. PATENT DOCUMENTS 5,036,321 A     7/1991  Leach et al.
8,654,542 B2    2/2014  Pance et al.
(Continued)

OTHER PUBLICATIONS

Kim, L. et al., "A Universal Remote Control with Haptic Interface for Customer Electronic Devices", 2010, p. 1, IEEE.

*Primary Examiner* — Joseph R Haley
(74) *Attorney, Agent, or Firm* — Treyz Law Group, P.C.; Kendall P. Woodruff

(57) ABSTRACT

An electronic device may include touch input components and associated haptic output components. The control circuitry may provide haptic output in response to touch input on the touch input components and may send wireless signals to the external electronic device based on the touch input. The haptic output components may provide local and global haptic output. Local haptic output may be used to guide a user to the location of the electronic device or to provide a button click sensation to the user in response to touch input. Global haptic output may be used to notify the user that the electronic device is aligned towards the external electronic device and is ready to receive user input to control or communicate with the external electronic device. Control circuitry may switch a haptic output component into an inactive mode to inform the user that a touch input component is inactive.

19 Claims, 15 Drawing Sheets

Related U.S. Application Data continuation of application No. 17/467,035, filed on Sep. 3, 2021, now Pat. No. 11,579,701, which is a continuation of application No. 16/396,479, filed on Apr. 26, 2019, now Pat. No. 11,119,574.

(60) Provisional application No. 62/663,793, filed on Apr. 27, 2018.

(51) Int. Cl.
*G06F 3/041* (2006.01)
*G06F 3/044* (2006.01)

(56) References Cited

U.S. PATENT DOCUMENTS

| | | | |
|---|---|---|---|
| 8,723,824 B2 | 5/2014 | Myers et al. | |
| 10,310,611 B1 | 6/2019 | Hovis | |
| 2009/0116691 A1 | 5/2009 | Scholl | |
| 2011/0018695 A1 | 1/2011 | Bells et al. | |
| 2011/0216013 A1 | 9/2011 | Siotis | |
| 2012/0038582 A1 | 2/2012 | Grant | |
| 2012/0092204 A1* | 4/2012 | Talstra ................... | H05B 47/19 |
| | | | 341/176 |
| 2012/0229424 A1 | 9/2012 | Behles et al. | |
| 2014/0085221 A1 | 3/2014 | Kim | |
| 2016/0238692 A1 | 8/2016 | Hill et al. | |
| 2017/0213449 A1* | 7/2017 | Tchedikian ............ | G08C 17/02 |
| 2018/0176965 A1 | 6/2018 | Mathias et al. | |
| 2018/0193731 A1 | 7/2018 | Oizumi et al. | |

* cited by examiner

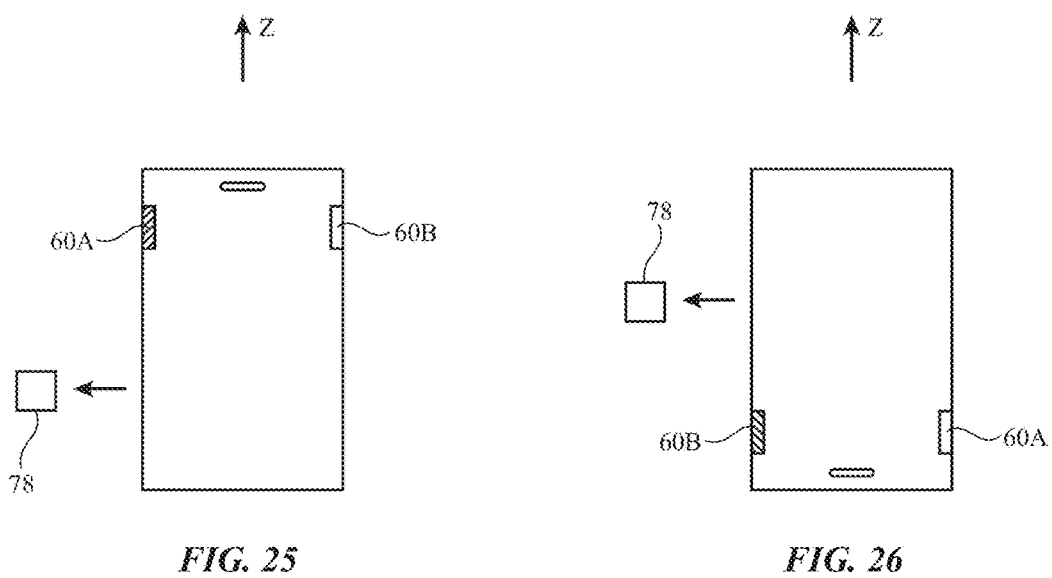
*FIG. 25*             *FIG. 26*
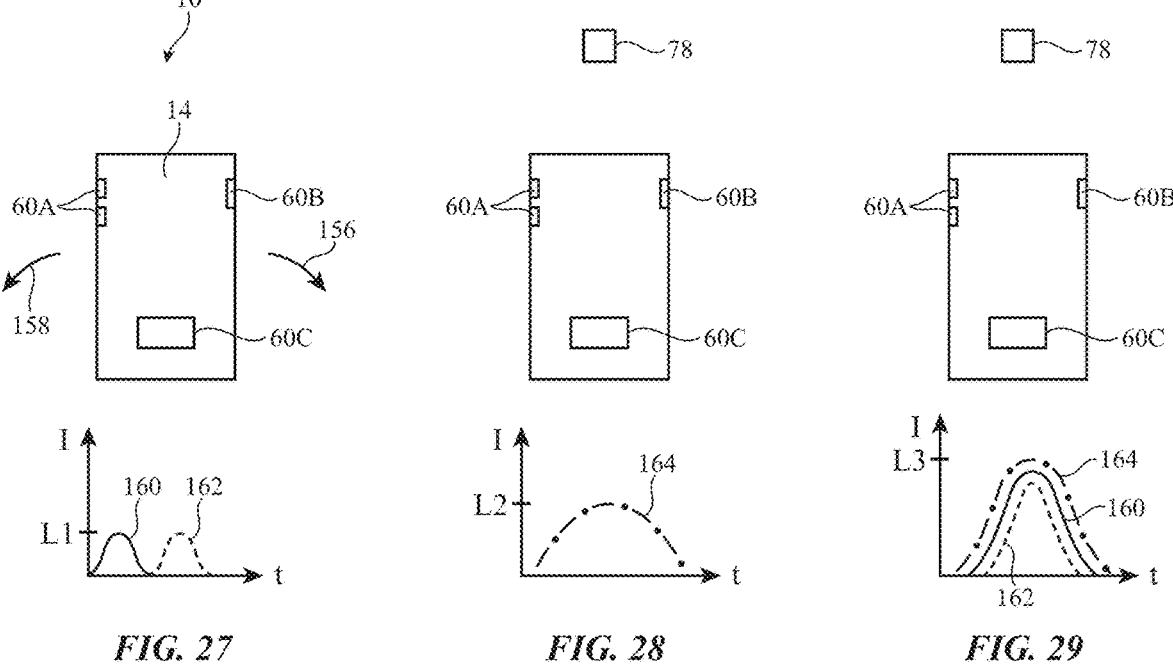
*FIG. 27*        *FIG. 28*        *FIG. 29*

ELECTRONIC DEVICES WITH TOUCH INPUT COMPONENTS AND HAPTIC OUTPUT COMPONENTS

This application is a continuation of patent application Ser. No. 18/167,762, filed Feb. 10, 2023, which is a continuation of patent application Ser. No. 17/467,035, filed Sep. 3, 2021, now U.S. Pat. No. 11,579,701, which is a continuation of patent application Ser. No. 16/396,479, filed Apr. 26, 2019, now U.S. Pat. No. 11,119,574, which claims the benefit of provisional patent application No. 62/663,793, filed Apr. 27, 2018, all of which are hereby incorporated by reference herein in their entireties.

FIELD

This relates generally to electronic devices and, more particularly, to electronic devices that supply haptic output.

BACKGROUND

Electronic devices often include wireless communications circuitry. For example, cellular telephones, computers, and other devices often contain antennas and wireless transceivers for supporting wireless communications.

Electronic devices often communicate with other electronic devices. For example, a user may wirelessly share files with another nearby user over a short-range communications link such as Bluetooth® or WiFi®. A user may use his or her mobile device to wirelessly control a household electronic device such as a television.

Communicating with external electronic devices can be cumbersome for a user. The user may have to take several steps to control or otherwise communicate with an external device. The user may not know when the external device is sufficiently close to establish a short-range wireless communications link. There may be multiple devices within range, making it challenging to select the appropriate external device. Touch-sensitive displays may be used to help a user communicate with other electronic devices, but requiring a user to interact with the display may not always be intuitive for the user.

SUMMARY

An electronic device may be provided with wireless circuitry. The wireless circuitry may include one or more antennas. The antennas may include millimeter wave antenna arrays, ultra-wideband antennas, or other antennas. The antennas may also include wireless local area network antennas, satellite navigation system antennas, cellular telephone antennas, and other antennas. The wireless circuitry may be used to send signals to and/or receive signals from an external electronic device. The wireless circuitry may determine a location of the external electronic device relative to the electronic device based on a phase difference associated with the received antenna signals.

The electronic device may include input-output devices that allow a user to more intuitively control or otherwise communicate with an external electronic device. The input-output devices may include touch input components and associated haptic output components, which may be formed along the sidewalls or other areas of the electronic device. The control circuitry may provide haptic output in response to touch input on the touch input components and may also send wireless signals to the external electronic device based on the touch input. The haptic output components may provide local and global haptic output. Local haptic output may be used to guide a user to the location of the electronic device or to provide a button click sensation to the user in response to touch input. Global haptic output may be used to notify the user that the electronic device is aligned towards the external electronic device and is ready to receive user input to control or communicate with the external electronic device.

The touch input components may be configured to measure a force associated with touch input. Control circuitry may control the intensity of haptic output based on the force and/or may control the user input function associated with the touch input based on the force.

The control circuitry may gather information about the external electronic device and may control the input-output devices based on the information about the external electronic device. This may include assigning different user input functions to each touch sensor based on the capabilities of the external electronic device, activating some touch input components and inactivating other touch input components based on the capabilities of the external electronic device, and activating some haptic output components and inactivating other haptic output components based on the capabilities of the external electronic device.

Control circuitry may also activate or inactivate certain touch input components and haptic output components based on whether the electronic device is being pointed towards the external electronic device. If a user points the electronic device towards the external electronic device, some or all of the touch input components and haptic output components may be activated to allow the user to control or otherwise communicate with the external electronic device. If the user is not pointing the electronic device towards an external electronic device, some or all of the touch input components and haptic output components may be inactivated. Without the active haptic output components, the user may not feel a click sensation when he or she taps or presses the associated touch input component.

BRIEF DESCRIPTION OF THE DRAWINGS

FIG. 25 is a diagram illustrating how haptic output components may be selected when an electronic device is in an upright position in accordance with an embodiment.

FIG. 26 is a diagram illustrating how haptic output components may be selected when an electronic device is in an upside down position in accordance with an embodiment.

FIG. 27 is a diagram illustrating how a first type of haptic output may be provided as a user searches for an object in accordance with an embodiment.

FIG. 28 is a diagram illustrating how a second type of haptic output may be provided as a user finds an object in accordance with an embodiment.

FIG. 29 is a diagram illustrating how a third type of haptic output may be provided as a user establishes a connection with an object in accordance with an embodiment.

DETAILED DESCRIPTION

A system may include one or more electronic devices. In some scenarios, a first electronic device may be used to control a second electronic device. For example, a first electronic device may serve as an input-output device for a second electronic device. In other scenarios, a first electronic device may send information to and/or receive information from a second electronic device. Haptic output components may be included in the electronic devices to provide a user with haptic output.

An electronic device may also include input-output devices such as sensors for receiving input from a user. The input-output devices may include touch input components such as touch sensors and force sensors for gathering input from a user's fingers and may include other circuitry such as motion sensors and antennas for determining whether a user is pointing the first electronic device at a second electronic device and receiving other motion input. These types of input-output devices may be used in combination with haptic output components to provide an intuitive way for a user to control or otherwise communicate with external electronic devices.

Figure 1:
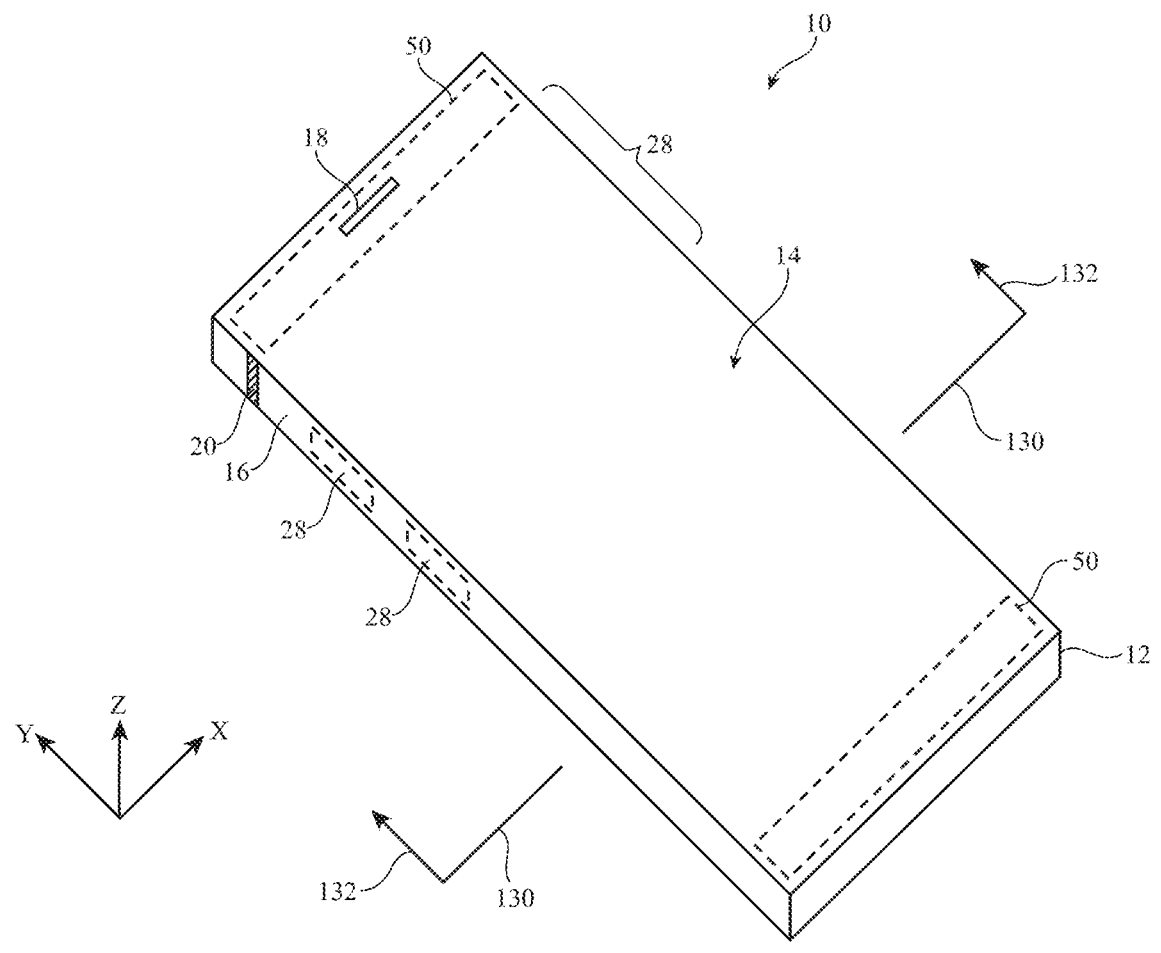
FIG. 1 is a perspective view of an illustrative electronic device in accordance with an embodiment.

FIG. 1 is a perspective view of an illustrative electronic device. An electronic device such as electronic device 10 of FIG. 1 may interact with nodes in a network. The term "node" may be used to refer to an electronic device, an object without electronics, and/or a particular location in a mapped environment. Electronic device 10 may have control circuitry that determines where other nodes are located relative to electronic device 10. The control circuitry in device 10 may synthesize information from cameras, motion sensors, wireless circuitry such as antennas, and other input-output circuitry to determine how far a node is relative to device 10 and/or to determine the orientation of device 10 relative to that node. The control circuitry may use output components in device 10 to provide output (e.g., display output, audio output, haptic output, or other suitable output) to a user of device 10 based on the position of the node.

Antennas in device 10 may include cellular telephone antennas, wireless local area network antennas (e.g., WiFi® antennas at 2.4 GHz and 5 GHz and other suitable wireless local area network antennas), satellite navigation system signals, and near-field communications antennas. The antennas may also include antennas for handling ultra-wideband communications and/or millimeter wave communications. For example, the antennas may include one or more ultra-wideband and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 10 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

As shown in FIG. 1, device 10 may include a display such as display 14. Display 14 may be mounted in a housing such as housing 12. For example, device 10 may have opposing front and rear faces and display 14 may be mounted in housing 12 so that display 14 covers the front face of device 10 as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). If desired, different portions of housing 12 may be formed from different materials. For example, housing sidewalls may be formed from metal and some or all of the rear wall of housing 12 may be formed from a dielectric such as plastic, glass, ceramic, sapphire, etc. Dielectric rear housing wall materials such as these may, if desired, by laminated with metal plates and/or other metal structures to enhance the strength of the rear housing wall (as an example).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels, an array of electrowetting pixels, or pixels based on other display technologies.

Display 14 may be protected using a display cover layer such as a layer of transparent glass, clear plastic, sapphire, or other transparent dielectric. Openings may be formed in the display cover layer. For example, an opening may be formed in the display cover layer to accommodate a port such as speaker port 18. If desired, an opening may be formed in the display cover layer to accommodate a button (e.g., a mechanical or non-mechanical button). Buttons may also be formed from capacitive touch sensors, light-based touch sensors, or other structures that can operate through the display cover layer without forming an opening.

Openings may be formed in housing 12 to form communications ports (e.g., an audio jack port, a digital data port, etc.). Openings in housing 12 may also be formed for audio components such as a speaker and/or a microphone. Dielectric-filled openings 20 such as plastic-filled openings may be formed in metal portions of housing 12 such as in metal sidewall structures (e.g., to serve as antenna windows and/or to serve as gaps that separate portions of antennas from each other).

Antennas may be mounted in housing 12. If desired, some of the antennas (e.g., antenna arrays that may implement beam steering, etc.) may be mounted under dielectric portions of device 10 (e.g., portions of the display cover layer, portions of a plastic antenna window in a metal housing sidewall portion of housing 12, etc.). With one illustrative configuration, some or all of rear face of device 12 may be formed from a dielectric. For example, the rear wall of housing 12 may be formed from glass plastic, ceramic, other dielectric. In this type of arrangement, antennas may be mounted within the interior of device 10 in a location that allows the antennas to transmit and receive antenna signals through the rear wall of device 10 (and, if desired, through optional dielectric sidewall portions in housing 12). Antennas may also be formed from metal sidewall structures in housing 12 and may be located in peripheral portions of device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing, along the peripheral edges of housing 12, on the rear of housing 12, under the display cover layer that is used in covering and protecting display 14 on the front of device 10 (e.g., a glass cover layer, a sapphire cover layer, a plastic cover layer, other dielectric cover layer structures, etc.), under a dielectric window on a rear face of housing 12 or the edge of housing 12, under a dielectric rear wall of housing 12, or elsewhere in device 10. As an example, antennas may be mounted at one or both ends 50 of device 10 (e.g., along the upper and lower edges of housing 12, at the corners of housing 12, etc.).

Device 10 may have opposing front and rear faces. Display 14 may be formed on the front face. A rear wall of housing 12 may be formed on the opposing rear face. Sidewalls 16 may extend between peripheral portions of display 14 on the front face and peripheral portions of the rear wall of housing 12 on the rear face. Sidewalls 16 may be formed from one or more structures that are separated from the rear wall structures of housing 12 and/or may have portions that are formed integrally with the rear wall of housing 12. Sidewalls 16 may extend vertically and may form planar sidewall surfaces and/or sidewalls 16 may have portions with curve cross-sectional shapes (e.g., so that the outer surfaces of sidewalls 16 are curved). Display 14 may have any suitable footprint (outline when viewed from above) such as rectangular footprint, an oval or circular shape, etc. In the example of FIG. 1, display 14 and device 10 have a rectangular outline and housing sidewalls 16 run along each of the four edges of display 14 and device 10. Other arrangements may be used for device 10, if desired.

Input-output components may be formed on sidewalls 16 (e.g., in the portion of housing 12 in regions 28 of sidewalls 16 and/or other portions of housing 12). When a user grips device 10, the user's fingers or other portions of a user's body may overlap regions 28 of sidewalls 16 and/or other portions of sidewalls 16 that have been provided with input-output components. The input-output components may include touch sensors, force sensors, mechanical buttons, non-mechanical buttons, and/or other input sensors for determining where a user has touched device 10. The input-output components may also include haptic output devices. For example, device 10 may include strips of capacitive touch sensor electrodes in regions 28 that are overlapped by haptic output components in regions 28. Using this arrangement, user input can be sensed using a touch sensor formed from the touch sensor electrodes while haptic output may be supplied to the user by the associated haptic output components.

Haptic output devices in regions 28 (e.g., regions 28 on the left and right edges of device 10 in the example of FIG. 1 and/or other sidewall regions) and haptic output devices on other surfaces or regions of device 10 (e.g., rear wall surfaces, portions of display 14, the interior of housing 12, etc.) may be used to apply forces perpendicular to the surface(s) being contacted by a user's finger(s) and/or may be used to apply forces tangential to the surface(s) being contacted by the user's finger(s). Perpendicular forces (sometimes referred to as normal forces) may displace the user's finger inwardly or outwardly. Tangential forces (sometimes referred to as shear forces) push and/or pull the user's finger parallel to the surfaces of device 10.

Figure 2:
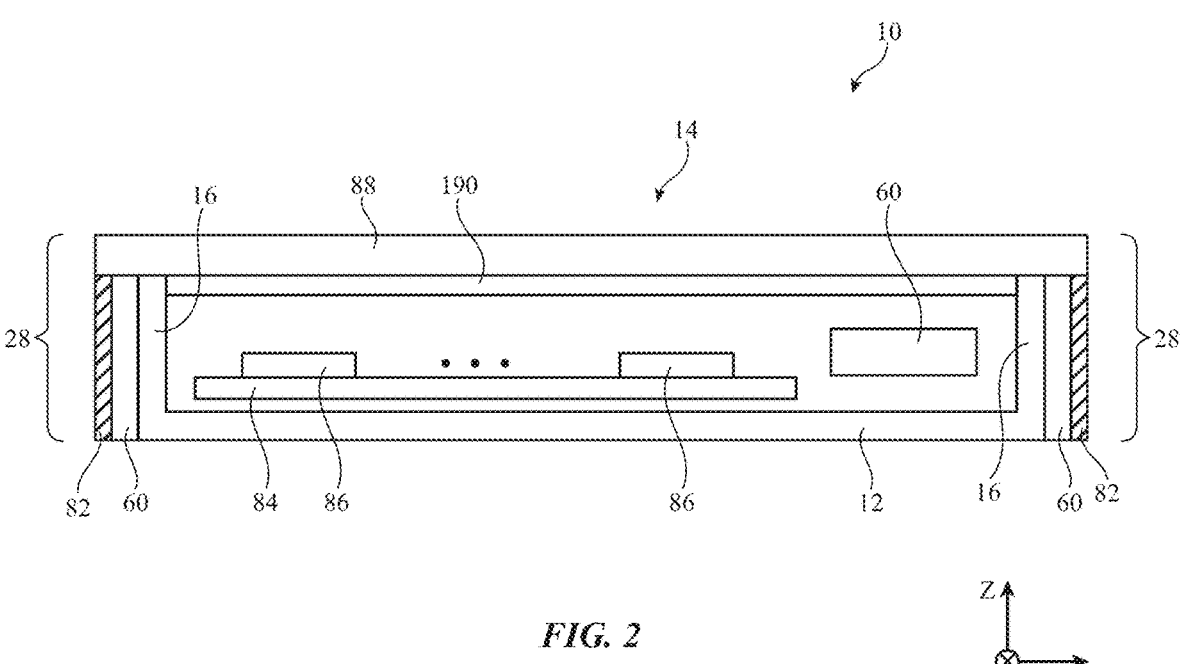
FIG. 2 is a cross-sectional side view of the illustrative electronic device of FIG. 1 in accordance with an embodiment.

A cross-sectional side view of electronic device 10 of FIG. 1 taken along line 130 and viewed in direction 132 is shown in FIG. 2. As shown in FIG. 2, display 14 of device 10 may be formed from a display module such as display module 190 mounted under a cover layer such as display cover layer 88 (as an example). Display 14 (display module 190) may be a liquid crystal display, an organic light-emitting diode display, a display formed from a pixel array having an array of light-emitting diodes formed from respective crystalline semiconductor dies, an electrophoretic display, a display that is insensitive to touch, a touch sensitive display that incorporates and array of capacitive touch sensor electrodes or other touch sensor structures, or may be any other type of suitable display. Display cover layer 88 may be layer of clear glass, a transparent plastic member, a transparent crystalline member such as a sapphire layer, or other clear structure. Display layers such as the layers of display layers (module) 190 may be rigid and/or may be flexible (e.g., display 14 may be flexible).

Display 14 may be mounted to housing 12. Device 10 may have inner housing structures that provide additional structural support to device 10 and/or that serve as mounting platforms for printed circuits and other structures. Structural internal housing members may sometimes be referred to as housing structures and may be considered to form part of housing 12.

Electrical components 86 may be mounted within the interior of housing 12. Components 86 may be mounted to printed circuits such as printed circuit 84. Printed circuit 84 may be a rigid printed circuit board (e.g., a printed circuit board formed from fiberglass-filled epoxy or other rigid printed circuit board material) or may be a flexible printed circuit (e.g., printed circuit formed from a sheet of polyimide or other flexible polymer layer). Patterned conductive traces within printed circuit board 84 may be used to form signal paths between components 86.

Haptic output components 60 may be mounted in regions 28, may be mounted in the interior of housing 12, and/or may be mounted in other suitable areas of device 10 and housing 12. Touch input components 82 may, if desired, be mounted so as to overlap haptic output components 60 or may be mounted in other locations of device 10 (e.g., locations that do not overlap haptic output components 60).

Touch input components 82 may include touch sensors, force sensors, electrical switches, and/or other input devices that receive user input through proximity, contact, or force from a user's finger, hand, or other object. Touch input components 82 may be mechanical buttons or non-mechanical buttons. Mechanical buttons may include an electrical switch that is actuated by a button member when the button member is depressed or otherwise actuated by a user. The button member of a mechanical button in components 82 may move up and down (e.g., along dimension X of FIG. 2), may move laterally (e.g., along the Y-Z plane of FIG. 2), may rock back and forth, may pivot, or may otherwise move to actuate an electrical switch.

Non-mechanical buttons may be formed from solid state semiconductor materials and/or may include touch sensors such as capacitive touch sensor electrodes. Non-mechanical buttons do not rely on electrical switches and therefore can be operated without movement of a button member (e.g., touch input components 82 may be non-movable with respect to the surrounding portions of housing 12). This is, however, merely illustrative. If desired, non-mechanical buttons (e.g., buttons that receive input through a touch sensor rather than a mechanical switch) may be formed from touch sensors on or overlapping with a movable structure (e.g., a button member) and/or may be formed from touch sensors on a structure that appears to move without actually moving (e.g., by providing haptic output that mimics a button press). The button member of a non-mechanical button in components 82 may move up and down (e.g., along dimension X of FIG. 2), may move laterally (e.g., along the Y-Z plane of FIG. 2), may rock back and forth, may pivot, or may otherwise move.

In arrangements where touch input components 82 are non-mechanical buttons, haptic output components 60 may be used to provide haptic feedback to the user in response to touch input to components 82. The haptic output may be local haptic output only felt in region 28 or may be global haptic output that spans across device 10. The haptic output may mimic a button click sensation when a user presses touch input components 82. This gives the user the impression that touch input components 82 move (e.g., depress in the X direction) like a button even though touch input components 82 may not actually be moving (or may only be moving laterally in the Y-Z plane rather than up and down in the X direction).

In other arrangements, non-mechanical buttons may include a movable button member, and the movement of the button member may provide haptic feedback for the user. In other words, movable button members associated with non-mechanical buttons in components 82 may form part of haptic output components 60. If desired, the movement of the button member in the non-mechanical buttons may be controlled by an electrical signal. For example, control circuitry in device 10 may prevent or allow movement of a button member associated with a non-mechanical button in touch input components 82. When active, the user may be able to move the button member. When inactive, the user may be unable to move the button member. This type of haptic feedback lets the user know when his or her touch input to components 82 is actively being processed to result in a user input function being executed.

In some arrangements, touch input components 82 may be formed on a surface of housing 12 that is indistinguishable (e.g., indistinguishable visually and/or by feel) from the surrounding portions of housing 12. For example, housing 12 may have a smooth continuous surface across regions 28 and other portions of housing 12 (e.g., regions that do not receive user input).

In other arrangements, touch input components 82 may be formed on separate structures that are either visually distinguishable from housing 12 and/or distinguishable from housing 12 by feel. For example, housing 12 may have one or more openings along sidewall 16 and touch input components 82 may be located in the openings. The touch input components 82 may be flush with (e.g., coplanar) with the surrounding portions of housing 12, may protrude above the surrounding portions of housing 12, or may be recessed with respect to the surrounding portions of housing 12.

Haptic output components 60 and/or touch input components 82 may be mounted on exterior surfaces of housing 12, in the interior of housing 12 adjacent to the walls of housing 12 (e.g., so that haptic output devices 60 may provide haptic output through the walls of housing 12), and/or may be embedded within housing walls of housing 12. Configurations in which haptic output components 60 and input components such as touch input components 82 are mounted on exterior surfaces of housing 12 may sometimes be described herein as an example. This is merely illustrative. Haptic output devices such as components 60 of FIG. 2 may be mounted on or in any suitable portions of housing 12 that allow haptic output to be provided to a user of device 10 and touch and force sensors may be mounted on any suitable portions of housing 12 that allow these sensors to gather user touch and force input.

Haptic output components 60 may provide localized haptic output on device 10 or may provide global haptic output on device 10. Local haptic output may be felt by a user at a particular location on device 12. The local haptic output may feel like a localized button click, a gentle nudge in a particular direction, or other haptic sensation that is felt locally at a particular region of device 10. Global haptic output may span across device 10 rather than only a localized region of device 10. If desired, all of haptic output components 60 may be configured to switch between global and local haptic output modes. In other arrangements, some haptic output components 60 may be dedicated localized haptic output components while others may be dedicated global haptic output components.

Haptic output component 60 need not be mounted directly over touch input component 82 in order to provide localized haptic output on touch input component 82. A remote haptic output component, such as haptic output component 60 within the interior of housing 12 in FIG. 2, may be used to provide what feels like a localized haptic effect in a different region of device 10 (e.g., near touch input component 82 on sidewall 16).

Haptic output components 60 and touch input components 82 may be operable in active mode and inactive mode. When touch input components 82 are in active mode, touch input components 82 actively detect touch that results in a user input function being executed by control circuitry 22. When haptic output components 60 are in active mode, haptic output components 60 provide haptic output in response to touch input on components 82. When touch input components 82 are in inactive mode, touches on touch input components 82 may not result in user input functions being executed. Similarly, when haptic output components 60 are in inactive mode, haptic output components 60 may not provide haptic output even when a user touches input components 82. In arrangements where touch input components 82 are formed from non-mechanical buttons, the lack of haptic feedback from haptic output components 60 when components 60 are inactive feels like an inability to click or depress regions 28. The nonresponsive surface in regions 28 may therefore let the user know that touch input components 82 in regions 28 are not actively processing the user's touch input.

FIGS. 3, 4, 5, 6, 7, and 8 are diagrams of illustrative haptic output components 60.

Figure 3:
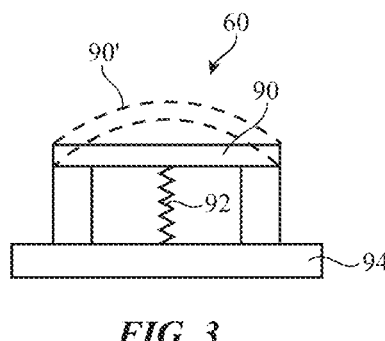
FIG. 3 is a cross-sectional side view of an illustrative haptic output component with a central deflecting portion in accordance with an embodiment.

Illustrative haptic output component 60 of FIG. 3 has a piezoelectric member such as member 90. A biasing structure such as spring 92 is interposed between support structure 94 and the lower surface of member 90 and configured to push upwards on member 90. During operation, control signals (e.g., control voltages) may be applied to member 90 using electrodes on the upper and lower surfaces of member 90. The control signals may be adjusted to adjust the tension of member 90. When member 90 is adjusted to exhibit a high tension, member 90 will compress spring 92 and will have a planar shape. When member 90 is adjusted to exhibit low tension, member 90 will relax and will be moved upwards to position 90' by spring 92.

Figure 4:
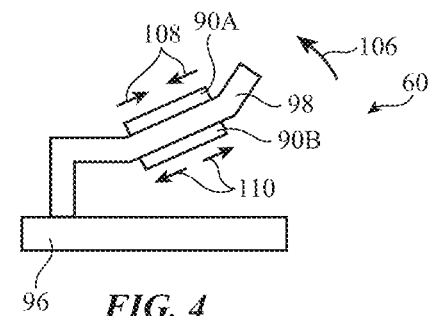
FIG. 4 is a cross-sectional side view of an illustrative deflecting beam haptic output component in accordance with an embodiment.

Illustrative haptic output component 60 may have a deflectable beam such as beam 98 of FIG. 4 that is attached to support structure 96. Piezoelectric members 90A and 90B may be coupled to the upper and lower surfaces of beam 98. Control signals may be supplied to electrodes in members 90A and 90B to cause these members to contract or expand. As shown in FIG. 4, for example, signals may be supplied to members 90A and 90B to cause member 90A to contract inwardly in directions 108 while causing member 90B to expand outwardly in directions 110. This causes beam 98 to deflect in direction 106.

Figure 5:
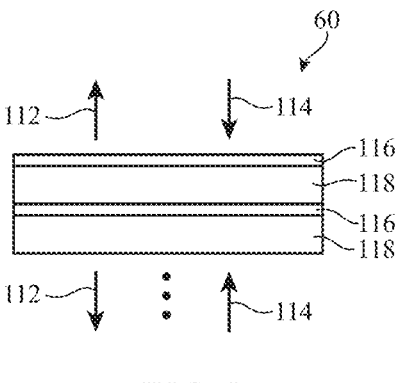
FIG. 5 is cross-sectional side view of an illustrative haptic output component based on a stack of haptic output structures in accordance with an embodiment.

Illustrative haptic output component 60 of FIG. 5 is formed from electrode layers 116 and adjustable material layers 118. During operation, control circuitry in device 10 may supply signals to electrode layers 116 that cause layers 118 to expand and contract. Multiple stacks of layers 116 and 118 may be included in component 60 to enhance the amount of displacement that is produced for a given applied signal. With one illustrative configuration, haptic output component 60 may be an electroactive polymer device (e.g., layers 118 may be formed from electroactive polymer). Arrangements of the type shown in FIG. 5 may also be used with piezoelectric ceramic layers, etc.

Figure 6:
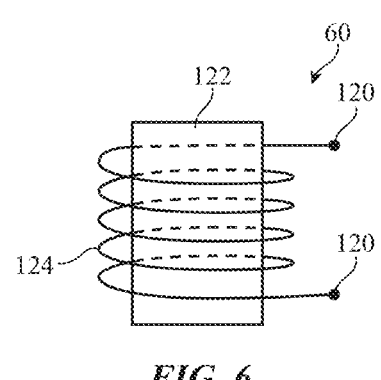
FIG. 6 is a side view of an illustrative voice coil haptic output component in accordance with an embodiment.

If desired, haptic output component 60 may be formed using electromagnetic structures. With one illustrative arrangement, which is shown in FIG. 6, haptic output component 60 is a voice coil actuator formed from a coil such as coil 124 and a corresponding magnet such as magnet 122. When current is supplied to terminals 120 of coil 124, a magnetic field is generated by coil 124. This magnetic field produces a force between magnet 122 and coil 124 and thereby causes magnet 122 and coil 124 to move relative to each other (e.g., vertically in the orientation of FIG. 6). Component 60 may use a moving coil design in which coil 124 is moved when current is applied to terminals 120 or a moving magnetic design in which magnet 122 is moved when current is applied to terminals 120. Haptic output components such as component 60 of FIG. 6 may sometimes be referred to as electromagnetic actuators. Any suitable geometry may be used for an electromagnetic actuator (rotary, linear, etc.). The configuration of FIG. 6 is merely illustrative.

Figure 7:
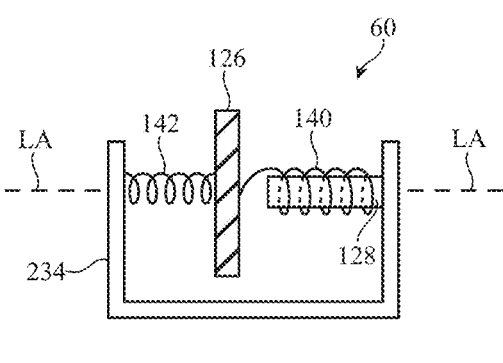
FIG. 7 is a cross-sectional side view of an illustrative linear resonance actuator haptic output component in accordance with an embodiment.

As shown in FIG. 7, haptic output component 60 may be a linear resonant actuator. Component 60 of FIG. 7 has a support structure such as support structure 234. Moving mass 126 is coupled to support structure 234 by spring 142. Coil 140 may receive a drive current and may interact electromagnetically with magnet 128. Coil 140 may be coupled to moving mass 126 and magnet 128 may be coupled to support structure 234 or vice versa, so that application of drive signals to coil 140 will cause moving magnet 128 to oscillate along axis LA.

Figure 8:
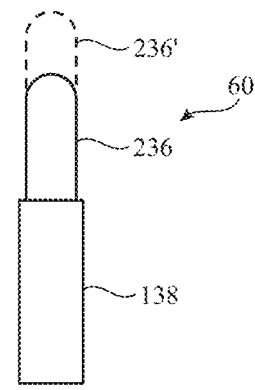
FIG. 8 is a side view of an illustrative haptic output component with a portion that extends when actuated in accordance with an embodiment.

As shown in FIG. 8, haptic output component 60 may have portion such as portion 236 that can be displaced (e.g., to a position such as displaced position 236' in the FIG. 8 example). Fluid such as pressurized air, rheological fluid that changes in viscosity under applied magnetic fields from an electromagnet in component 60, pressurized water, and/or other fluid may be introduced into a chamber in support structure 138 with controllable properties (pressure, viscosity, etc.), thereby adjusting the displacement of portion 236. Portion 236 may be an expandable diaphragm, may be a movable pin, or may be other suitable movable structure. If desired, an electromagnetic actuator (e.g., a servomotor or other motor, solenoid, etc.) can be used to adjust the displacement of portion 236.

The configurations for haptic output component 60 that are shown in FIGS. 3, 4, 5, 6, 7, and 8 are merely illustrative. In general, any suitable haptic output devices may be used in providing a user of an electronic device with haptic output.

Figure 9:
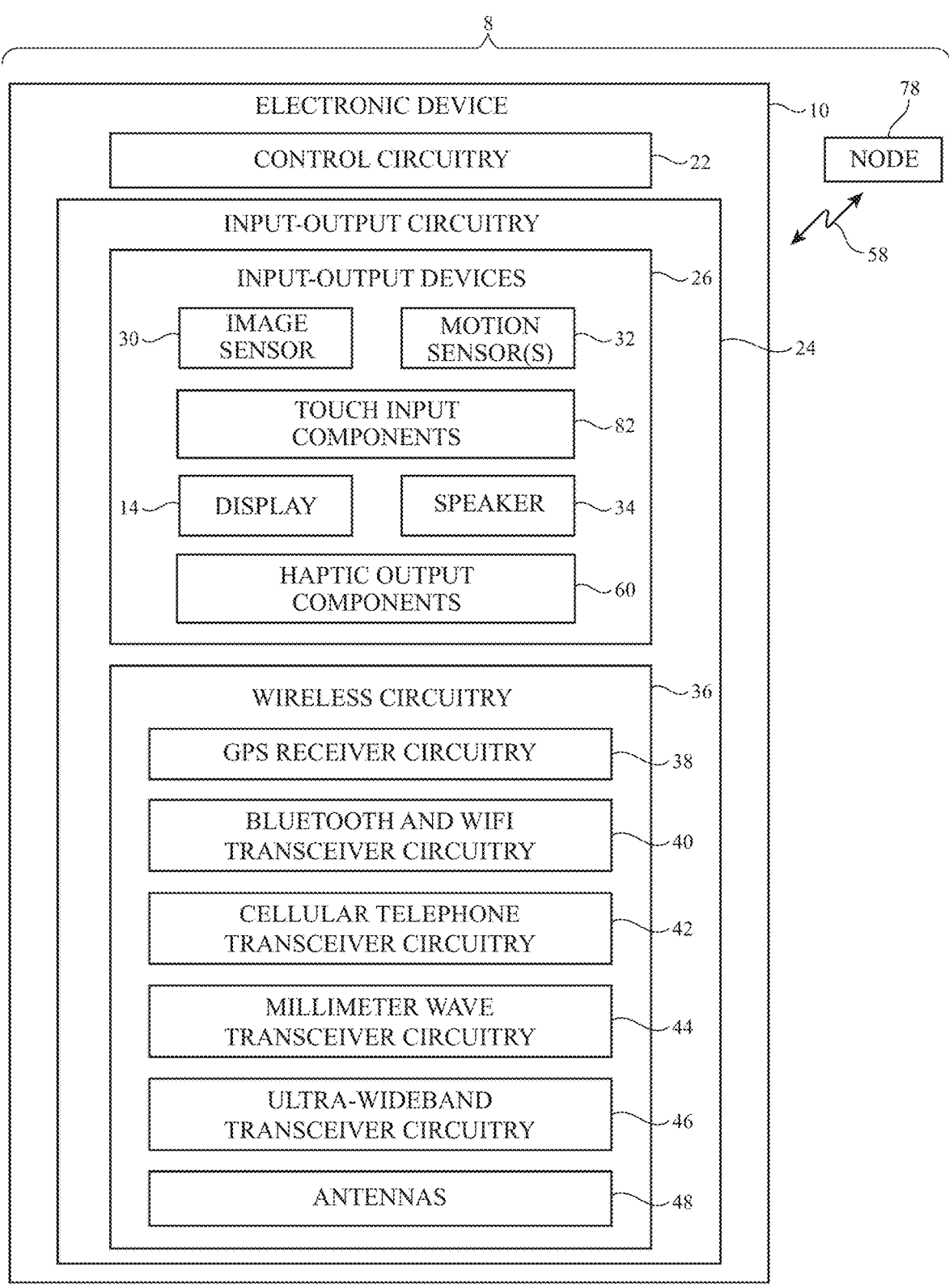
FIG. 9 is a schematic diagram of an illustrative system with an electronic device that communicates with an external electronic device in accordance with an embodiment.

FIG. 9 is a diagram of a system containing electronic devices of the type that may use haptic output components 60 to provide a user with haptic output. Electronic systems such as illustrative system 8 of FIG. 9 may include electronic devices such as electronic device 10 and nodes such as node 78. Node 78 may be an electronic device or other object. Device 10 may be used in supplying a user with haptic output. In some configurations, node 78 can be omitted and device 10 can be used to provide visual and/or audio output to a user of device 10 in conjunction with the haptic output. The haptic output may, as an example, be provided as feedback while a user is supplying touch input, force input, motion input, or other input to device 10.

In some scenarios, supplemental devices in system 8 such as device 78 (and, if desired, an additional electronic device coupled to device 78) may be used in providing visual, audio, and/or haptic output to a user while device 10 serves as a control device for device 78 (and any additional device coupled to device 78). Device 10 may, as an example, have touch sensors, motion sensors, and/or other sensors that gather user input. In some arrangements, this user input may be used in manipulating device 78 (e.g., controlling visual objects displayed by a display in device 78, illuminating a logo in device 78, powering device 78 on and off, controlling the brightness of light emitted from device 78, controlling the volume of audio output produced by device 78, etc.). In other scenarios, user input to device 10 may be used to send information to and/or receive information from device 78 (e.g., to send or receive a picture file, a video file, an audio file, contact information, or other electronic data). Haptic output components 60 may be included in device 10 and may be used to provide a user with haptic output associated with the user input. If desired, haptic output components 60 may be included in device 78 (e.g., a laptop computer, a tablet computer, a television, a head-mounted with a display and speakers, a head-mounted display with a display and speakers that is coupled to a computer, a set-top box, or other host, etc.), so that haptic output may be provided both by device 10 and by device 78.

As illustrated by communications link 58, device 10 may communicate with one or more additional electronic devices such as electronic device 78. Links such as link 58 in system 8 may be wired or wireless communication links. Devices in system 8 such as device 78 may include communications circuitry such as communications circuitry 36 of device 10 for supporting communications over links such as link 58.

As shown in FIG. 9, device 10 may include storage and processing circuitry such as control circuitry 22. Control circuitry 22 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 22 may be used to control the operation of device 10. This processing circuitry may be based on one or more microprocessors, microcontrollers, digital signal processors, baseband processor integrated circuits, application specific integrated circuits, etc.

Control circuitry 22 may be used to run software on device 10, such as internet browsing applications, voice-over-internet-protocol (VOIP) telephone call applications, email applications, media playback applications, operating system functions, etc. To support interactions with external equipment, control circuitry 22 may be used in implementing communications protocols. Communications protocols that may be implemented using control circuitry 22 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, millimeter wave communications protocols, IEEE 802.15.4 ultra-wideband communications protocols, etc.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, and other input-output components. For example, input-output devices 26 may include one or more image sensors 30, motion sensors 32, touch input components 82, displays 14 (e.g., touch screens or displays without touch sensor capabilities), speakers 34, and haptic output components 60.

Input-output devices 26 may also include buttons, joysticks, scrolling wheels, touch pads, key pads, keyboards, microphones, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Image sensors 30 may include one or more visible digital image sensors (visible-light cameras) and/or one or more infrared digital image sensors (infrared-light cameras). Image sensors 30 may, if desired, be used to measure distances. For example, an infrared time-of-flight image sensor may be used to measure the time that it takes for an infrared light pulse to reflect back from objects in the vicinity of device 10, which may in turn be used to determine the distance to those objects. Visible imaging systems such as a front and/or rear facing camera in device 10 may also be used to determine the position of objects in the environment. For example, control circuitry 22 may use image sensors 30 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 22 may rely entirely upon image sensors 30 to perform simultaneous localization and mapping, or control circuitry 22 may synthesize image data with range data from one or more distance sensors (e.g., light-based proximity sensors). If desired, control circuitry 22 may use display 14 to display a visual representation of the mapped environment.

Motion sensors 32 may include accelerometers, gyroscopes, magnetic sensors (e.g., compasses), and other sensor structures. Sensors 32 of FIG. 9 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Motion sensors 32 may include circuitry for detecting movement and orientation of device 10. Motion sensors that may be used in sensors 32 include accelerometers (e.g., accelerometers that measure acceleration along one, two, or three axes), gyroscopes, compasses, pressure sensors, other suitable types of motion sensors, etc. Storage and processing circuitry 22 may be used to store and process motion sensor data. If desired, motion sensors, processing circuitry, and storage that form motion sensor circuitry may form part of a system-on-chip integrated circuit (as an example).

Touch input components 82 may include force sensors and/or touch sensors. Touch input components 82 may include conductive capacitive touch sensor electrodes or other touch sensor components (e.g., resistive touch sensor components, acoustic touch sensor components, force-based touch sensor components, light-based touch sensor components, strain gauge components, etc.). Capacitive touch sensor electrodes may be formed from an array of indium tin oxide pads or other transparent conductive structures. Touch input components 82 may be configured to detect the location of touch input on device 10 and, if desired, to measure the amount of force associated with touch input on device 10. Touch input components 82 may include touch sensors and force sensors that work independently of one another (e.g., capacitive electrodes that detect touch and one or more strain gauges that detect force) and/or may include touch sensors that are integrated with force sensors (e.g., a single sensor may be used to detect touch and force).

Touch input components 82 may include mechanical buttons and/or non-mechanical buttons. Mechanical buttons may include a mechanical switch that is actuated by a button member when the button member is depressed by a user. Non-mechanical buttons may be formed from solid state semiconductor materials and/or may include touch sensors such as capacitive touch sensor electrodes. Non-mechanical buttons do not rely on mechanical switches and therefore can be operated without movement. This is, however, merely illustrative. If desired, non-mechanical buttons may be formed from touch sensors on a movable structure (e.g., a structure that moves relative to housing 12 just as a mechanical button would move) and/or may be formed from touch sensors on a structure that appears to move without actually moving (e.g., by providing haptic output that mimics a button press).

Other sensors that may be included in input-output devices 26 include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, lidar (light detection and ranging) sensors, radar sensors, and other suitable sensors.

Haptic output components 60 in input-output devices 26 may be used to provide haptic output to a user (e.g., based on sensed movement, wirelessly received information, etc.). In some configurations (e.g., when a haptic output component 60 has a piezoelectric material), components can serve both as haptic output components 60 and as touch input components 82. For example, a piezoelectric material may be driven with a signal to supply haptic output and, when not driven, may produce an output signal indicative of applied force. Using appropriate drive signals from control circuitry 22, haptic output components 60 may be used to supply a user's finger or other body part with a sensation of applied force in a given direction relative to the surface of sidewalls 16 or other housing surface of device 10. This type of haptic output, which may sometimes be referred to as directional haptic output, may be used to provide a user with sensations of increased or decreased weight, applied lateral force (e.g., force to the left or right in a horizontal plane), a sensation of device 10 slipping out of a user's grasp, a sensation of friction as a finger or other body part slides across a housing surface, etc.

If desired, haptic output from haptic output components 60 may be coordinated with user input from sensors such as touch input components 82. For example, control circuitry 22 may adjust the intensity, location, and/or pattern of haptic output from components 60 based on the location and/or force of touch input to touch input components 82 or based on the type of motion input to motion sensors 32. A hard press by a user's finger in regions 28 (FIG. 1) may result in a localized "click" feeling from haptic output components 60 in region 28. A lighter touch in region 28 may result in a lighter localized vibration of region 28 than a hard press in region 28. A user's intentional pointing of device 10 towards another device (e.g., node 78) may result in a global vibration of device 10 to indicate that a connection with node 78 has been established (so that the user can control node 78, send information to node 78, and/or receive information from node 78). This is, however, merely illustrative. If desired, global haptic output may be provided in response to touch input in regions 28 and/or local haptic output may be used to indicate a connection with node 78. Haptic output from components 60 may also be provided independently of user input. For example, localized haptic output may be used to guide a user to an object such as node 78. The use of localized and global haptic output from components 60 may help a user interact more intuitively with surrounding objects and devices by reducing the need for the user to look at device 10 at all times.

Input-output circuitry 24 may include wireless communications circuitry 36 for communicating wirelessly with external equipment. Wireless communications circuitry 36 may include radio-frequency (RF) transceiver circuitry formed from one or more integrated circuits, power amplifier circuitry, low-noise input amplifiers, passive radio-frequency components, one or more antennas 48, transmission lines, and other circuitry for handling radio-frequency wireless signals. Wireless signals can also be sent using light (e.g., using infrared communications).

Wireless communications circuitry 36 may include radio-frequency transceiver circuitry for handling various radio-frequency communications bands. For example, circuitry 36 may include transceiver circuitry 40, 42, 44, and 46.

Transceiver circuitry 40 may be wireless local area network transceiver circuitry. Transceiver circuitry 40 may handle 2.4 GHz and 5 GHz bands for WiFi® (IEEE 802.11) communications and may handle the 2.4 GHz Bluetooth® communications band.

Circuitry 36 may use cellular telephone transceiver circuitry 42 for handling wireless communications in frequency ranges such as a communications band from 700 to 960 MHz, a band from 1710 to 2170 MHz, a band from 2300 to 2700 MHZ, other bands between 700 and 2700 MHZ, higher bands such as LTE bands 42 and 43 (3.4-3.6 GHZ), or other cellular telephone communications bands. Circuitry 42 may handle voice data and non-voice data.

Millimeter wave transceiver circuitry 44 (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry 44 may support IEEE 802.11ad communications at 60 GHz. Circuitry 44 may be formed from one or more integrated circuits (e.g., multiple integrated circuits mounted on a common printed circuit in a system-in-package device, one or more integrated circuits mounted on different substrates, etc.).

Ultra-wideband transceiver circuitry 46 may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry 46 may operate in a 2.4 GHz frequency band and/or at other suitable frequencies.

Wireless communications circuitry 36 may include satellite navigation system circuitry such as Global Positioning System (GPS) receiver circuitry 38 for receiving GPS signals at 1575 MHz or for handling other satellite positioning data (e.g., GLONASS signals at 1609 MHz). Satellite navigation system signals for receiver 38 are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Extremely high frequency (EHF) wireless transceiver circuitry 44 may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 36 can include circuitry for other short-range and long-range wireless links if desired. For example, wireless communications circuitry 36 may include circuitry for receiving television and radio signals, paging system transceivers, near field communications (NFC) circuitry, etc.

Antennas 48 in wireless communications circuitry 36 may be formed using any suitable antenna types. For example, antennas 48 may include antennas with resonating elements that are formed from loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 48 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 48 can be configured to receive both satellite navigation system signals and signals for other communications bands (e.g., wireless local area network signals and/or cellular telephone signals). Antennas 48 can include phased antenna arrays for handling millimeter wave communications.

In configurations for device 10 in which housing 12 has portions formed from metal, openings may be formed in the metal portions to accommodate antennas 48. For example, openings in a metal housing wall may be used in forming splits (gaps) between resonating element structures and ground structures in cellular telephone antennas. These openings may be filled with a dielectric such as plastic. As shown in FIG. 1, for example, a portion of plastic-filled opening 20 may run up one or more of sidewalls 16 of housing 12.

Figure 10:
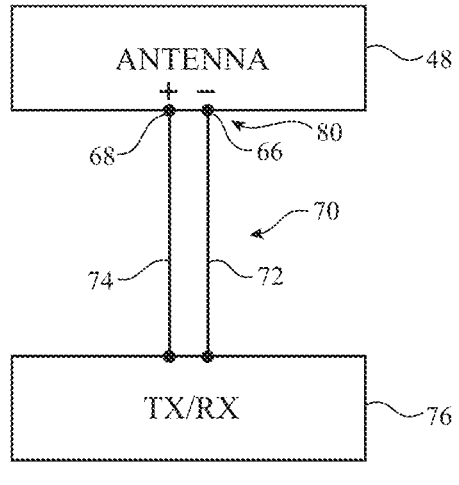
FIG. 10 is a diagram of an illustrative transceiver circuit and antenna in accordance with an embodiment.

A schematic diagram of a millimeter wave antenna or other antenna 48 coupled to transceiver circuitry 76 (e.g., wireless local area network transceiver circuitry 40, cellular telephone transceiver circuitry 42, millimeter wave transceiver circuitry 44, ultra-wideband transceiver circuitry 46, and/or other transceiver circuitry in wireless circuitry 36) is shown in FIG. 10. As shown in FIG. 10, radio-frequency transceiver circuitry 76 may be coupled to antenna feed 80 of antenna 48 using transmission line 70. Antenna feed 80 may include a positive antenna feed terminal such as positive antenna feed terminal 68 and may have a ground antenna feed terminal such as ground antenna feed terminal 66. Transmission line 70 may be formed from metal traces on a printed circuit or other conductive structures and may have a positive transmission line signal path such as path 74 that is coupled to terminal 68 and a ground transmission line signal path such as path 72 that is coupled to terminal 66. Transmission line paths such as path 70 may be used to route antenna signals within device 10. For example, transmission line paths may be used to couple antenna structures such as one or more antennas in an array of antennas to transceiver circuitry 76. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within transmission line 70 and/or circuits such as these may be incorporated into antenna 48 (e.g., to support antenna tuning, to support operation in desired frequency bands, etc.).

If desired, signals for millimeter wave antennas may be distributed within device 10 using intermediate frequencies (e.g., frequencies of about 5-15 GHz rather than 60 Hz). The intermediate frequency signals may, for example, be distributed from a baseband processor or other wireless communications circuit located near the middle of device 10 to one or more arrays of millimeter wave antennas at the corners of device 10. At each corner, upconverter and downconverter circuitry may be coupled to the intermediate frequency path. The upconverter circuitry may convert received intermediate frequency signals from the baseband processor to millimeter wave signals (e.g., signals at 60 GHz) for transmission by a millimeter wave antenna array. The downconverter circuitry may downconvert millimeter wave antenna signals from the millimeter wave antenna array to intermediate frequency signals that are then conveyed to the baseband processor over the intermediate frequency path.

Device 10 may contain multiple antennas 48. The antennas may be used together or one of the antennas may be switched into use while other antenna(s) are switched out of use. If desired, control circuitry 22 may be used to select an optimum antenna to use in device 10 in real time and/or to select an optimum setting for adjustable wireless circuitry associated with one or more of antennas 48. Antenna adjustments may be made to tune antennas to perform in desired frequency ranges, to perform beam steering with a phased antenna array, and to otherwise optimize antenna performance. Sensors may be incorporated into antennas 48 to gather sensor data in real time that is used in adjusting antennas 48.

In some configurations, antennas 48 may include antenna arrays (e.g., phased antenna arrays to implement beam steering functions). For example, the antennas that are used in handling millimeter wave signals for extremely high frequency wireless transceiver circuits 44 may be implemented as phased antenna arrays. The radiating elements in a phased antenna array for supporting millimeter wave communications may be patch antennas, dipole antennas, dipole antennas with directors and reflectors in addition to dipole antenna resonating elements (sometimes referred to as Yagi antennas or beam antennas), or other suitable antenna elements. Transceiver circuitry can be integrated with the phased antenna arrays to form integrated phased antenna array and transceiver circuit modules.

Figure 11:
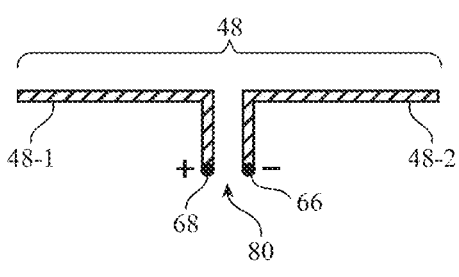
FIG. 11 is a diagram of an illustrative dipole antenna in accordance with an embodiment.

An illustrative dipole antenna is shown in FIG. 11. As shown in FIG. 11, dipole antenna 48 may have first and second arms such as arms 48-1 and 48-2 and may be fed at antenna feed 80. If desired, a dipole antenna such as dipole antenna 48 of FIG. 11 may be incorporated into a Yagi antenna (e.g., by incorporating a reflector and directors into dipole antenna 48 of FIG. 11).

Figure 12:
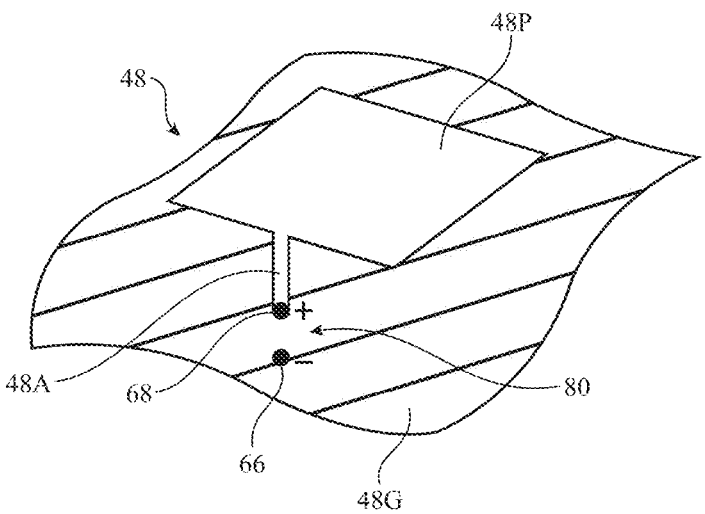
FIG. 12 is a perspective view of an illustrative patch antenna that may be used in an electronic device in accordance with an embodiment.

An illustrative patch antenna is shown in FIG. 12. As shown in FIG. 12, patch antenna 48 may have a patch antenna resonating element 48P that is separated from and parallel to a ground plane such as antenna ground plane 48G. Arm 48A may be coupled between patch antenna resonating element 48P and positive antenna feed terminal 68 of antenna feed 80. Ground antenna feed terminal 66 of feed 80 may be coupled to ground plane 48G.

Antennas of the types shown in FIGS. 11 and 12 and/or other antennas 48 may be used in forming millimeter wave antennas. The examples of FIGS. 11 and 12 are merely illustrative.

Figure 13:
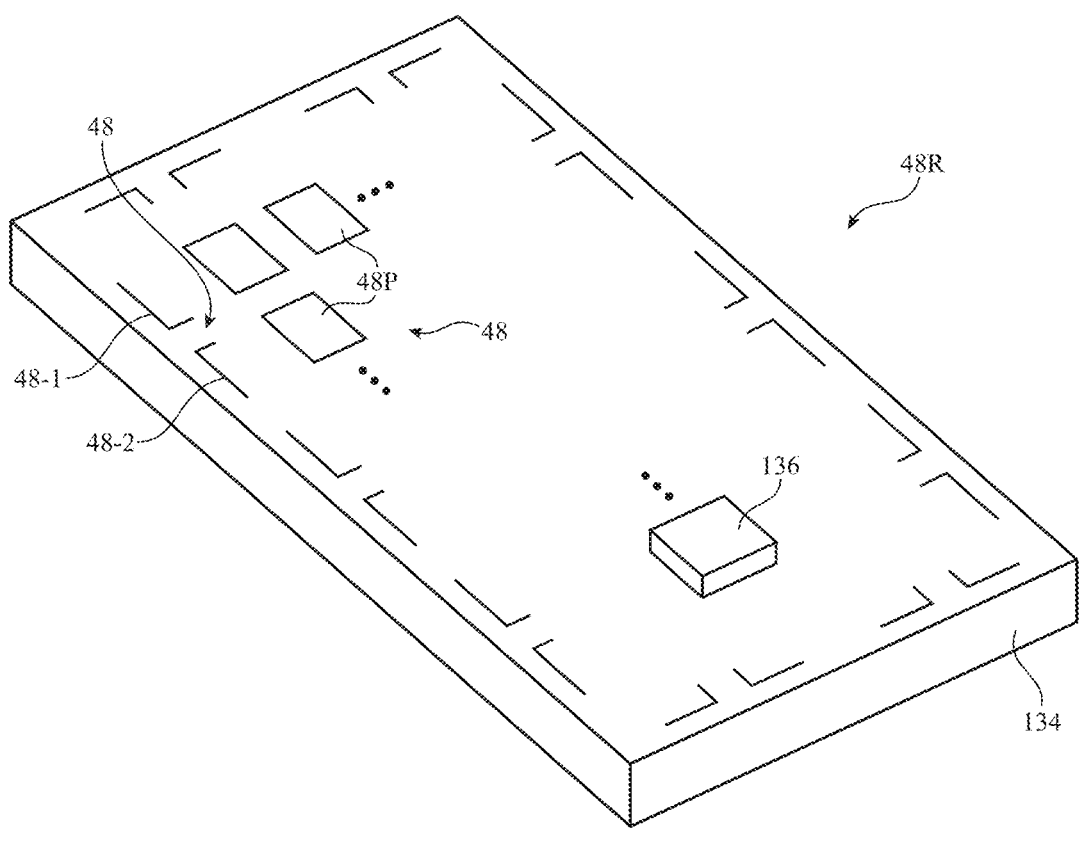
FIG. 13 is a perspective view of an illustrative array of millimeter wave antennas on a millimeter wave antenna array substrate in accordance with an embodiment.

FIG. 13 is a perspective view of an illustrative millimeter wave antenna array 48R formed from antenna resonating elements on millimeter wave antenna array substrate 134. Array 48R may include an array of millimeter wave antennas such as patch antennas 48 formed from patch antenna resonating elements 48P and dipole antennas 48 formed from arms 48-1 and 48-2. With one illustrative configuration, dipole antennas 48 may be formed around the periphery of substrate 134 and patch antennas 48 may form an array on the central surface of substrate 134. There may be any suitable number of millimeter wave antennas 48 in array 48R. For example, there may be 10-40, 32, more than 5, more than 10, more than 20, more than 30, fewer than 50, or other suitable number of millimeter wave antennas (patch antennas and/or dipole antennas, etc.). Substrate 134 may be formed from one or more layers of dielectric (polymer, ceramic, etc.) and may include patterned metal traces for forming millimeter wave antennas and signal paths. The signals paths may couple the millimeter wave antennas to circuitry such as one or more electrical devices 136 mounted on substrate 134. Device(s) 136 may include one or more integrated circuits, discrete components, upconverter circuitry, downconverter circuitry, (e.g., upconverter and downconverter circuitry that forms part of a transceiver), circuitry for adjusting signal amplitude and/or phase to perform beam steering, and/or other circuitry for operating antenna array 48R.

Figure 14:
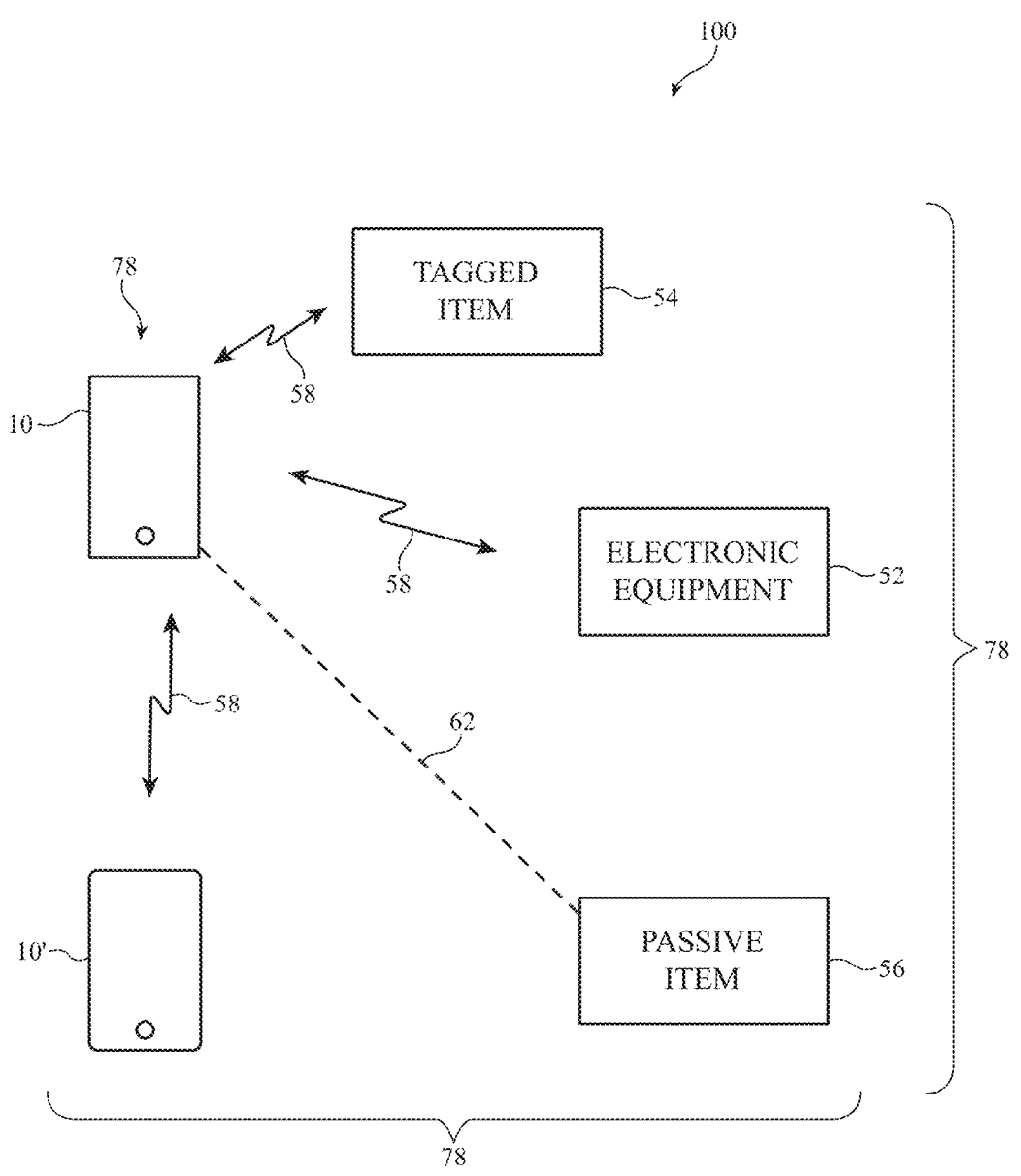
FIG. 14 is a diagram of an illustrative network having nodes in accordance with an embodiment.

FIG. 14 is a diagram of an illustrative network of objects that electronic device 10 may recognize and/or communicate wirelessly with. Network 100 may include nodes 78. Nodes 78 in network 100 may be electronic devices, may be objects without electronics, or may be particular locations in a mapped environment. Nodes 78 may be passive or active. Active nodes in network 100 may include devices that are capable of receiving and/or transmitting wireless signals such as signals 58. Active nodes in network 100 may include tagged items such as tagged item 54, electronic equipment such as electronic equipment 52, and other electronic devices such as electronic devices 10' (e.g., devices of the type described in connection with FIG. 9, including some or all of the same wireless communications capabilities as device 10). Tagged item 54 may be any suitable object that has been provided with a wireless receiver and/or a wireless transmitter. For example, tagged item 54 may be a key fob, a cellular telephone, a wallet, a laptop, a book, a pen, or other object that has been provided with a low-power transmitter (e.g., an RFID transmitter or other transmitter). Device 10 may have a corresponding receiver that detects the transmitted signals 58 from item 54 and determines the location of device 54 based on the received signals. In some arrangements, tagged item 54 may not include an internal power source and may instead be powered by electromagnetic energy from device 10 or other device. In other arrangements, tagged item 54 may include an internal power source.

Electronic equipment 52 may be an infrastructure-related device such as a thermostat, a smoke detector, a Bluetooth® Low Energy (Bluetooth LE) beacon, a WiFi® wireless access point, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device.

Device 10 may communicate with nodes 54, 52, and 10' using communications signals 58. Communications signals 58 may include Bluetooth® signals, near-field communications signals, wireless local area signals such as IEEE 802.11 signals, millimeter wave communication signals such as signals at 60 GHz, ultra-wideband radio frequency signals, other radio-frequency wireless signals, infrared signals, etc. Wireless signals 58 may be used to convey information such as location and orientation information. For example, control circuitry 22 in device 10 may determine the location of active nodes 54, 52, and 10' relative to device 10 using wireless signals 58. Control circuitry 22 may also use image data from image sensors 30, motion sensor data from motion sensors 32, and other sensor data (e.g., proximity data from a proximity sensor, etc.) to determine the location of active nodes 54, 52, and 10'.

Passive nodes in network 100 such as passive item 56 may include objects that do not emit or receive radio-frequency signals such as furniture, buildings, doors, windows, walls, people, pets, and other items. Item 56 may be an item that device 10 recognizes through feature tracking (e.g., using image sensor 30) or item 56 may be a particular location having an associated set of coordinates in a mapped environment. For example, control circuitry 22 may construct a virtual three-dimensional map of an environment (or may receive and store a previously-constructed three-dimensional map of an environment) and may assign objects or locations in the environment a set of coordinates (e.g., geographical coordinates, Cartesian coordinates, horizontal coordinates, spherical coordinates, or other suitable coordinates) in the three-dimensional map. In some arrangements, the virtual three-dimensional map may be anchored by one or more items with a known location (e.g., may be anchored by one or more tagged items 54 having a known location, electronic equipment 52 having a known location, or other items with a known location). Device 10 may then assign coordinates to passive items such as item 56 based on where passive item 56 is located relative to the anchored items in network 100. Device 10 may store the coordinates of passive item 56 and may take certain actions when device 10 is in a certain location or orientation relative to item 56. For example, if a user points device 10 in direction 62, control circuitry 22 may recognize that device 10 is being pointed at item 56 and may take certain actions (e.g., may display information associated with item 56 on display 14, may provide audio output via speakers 34, may provide haptic output via a vibrator or haptic actuator in device 10, and/or may take other suitable action). Because passive item 56 does not send or receive communication signals, circuitry 22 may use image data from image sensors 30, motion sensor data from motion sensors 32, and other sensor data (e.g., proximity data from a proximity sensor, etc.) to determine the location of passive item 56 and/or to determine the orientation of device 10 relative to item 56 (e.g., to determine when device 10 is being pointed at item 56).

Figure 15:
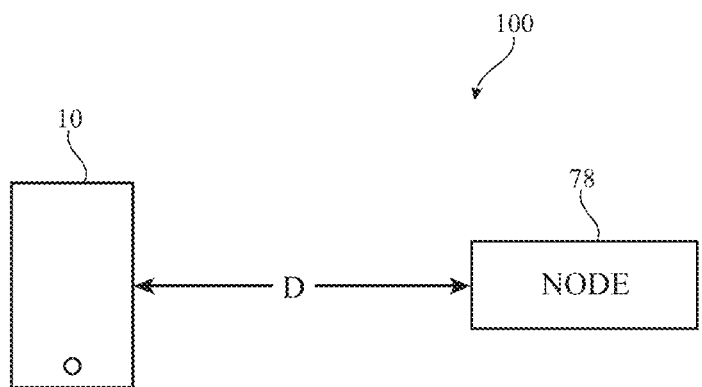
FIG. 15 is a diagram illustrating how a distance between an illustrative electronic device and a node in a network may be determined in accordance with an embodiment.

FIG. 15 shows how device 10 may determine a distance D between device 10 and node 78. In arrangements where node 78 is capable of sending or receiving communications signals (e.g., tagged item 54, electronic equipment 52, or other electronic devices 10' of FIG. 14), control circuitry 22 may determine distance D using communication signals (e.g., signals 58 of FIG. 14). Control circuitry 22 may determine distance D using signal strength measurement schemes (e.g., measuring the signal strength of radio signals from node 78) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, control circuitry 22 may determine distance D using Global Positioning System receiver circuitry 38, using proximity sensors (e.g., infrared proximity sensors or other proximity sensors), using image data from camera 30, motion sensor data from motion sensors 32, and/or using other circuitry in device 10.

Control circuitry 22 may also determine distance D using sensors such as infrared proximity sensors, depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, lidar (light detection and ranging) sensors, radar sensors, image sensors such as camera 30, and/or using other circuitry in device 10. In some arrangements, device 10 may store a set of coordinates for node 78, indicating where node 78 is located relative to other items in network 100. By knowing the location of node 78 relative to anchored nodes in network 100 and knowing the location of the anchored nodes relative to device 10, device 10 can determine the distance D between device 10 and node 78. These types of methods may be useful in scenarios where node 78 is a passive item that does not send or receive wireless communications signals. However, control circuitry 22 may also employ these techniques in scenarios where node 78 is capable of wireless communications.

Figure 16:
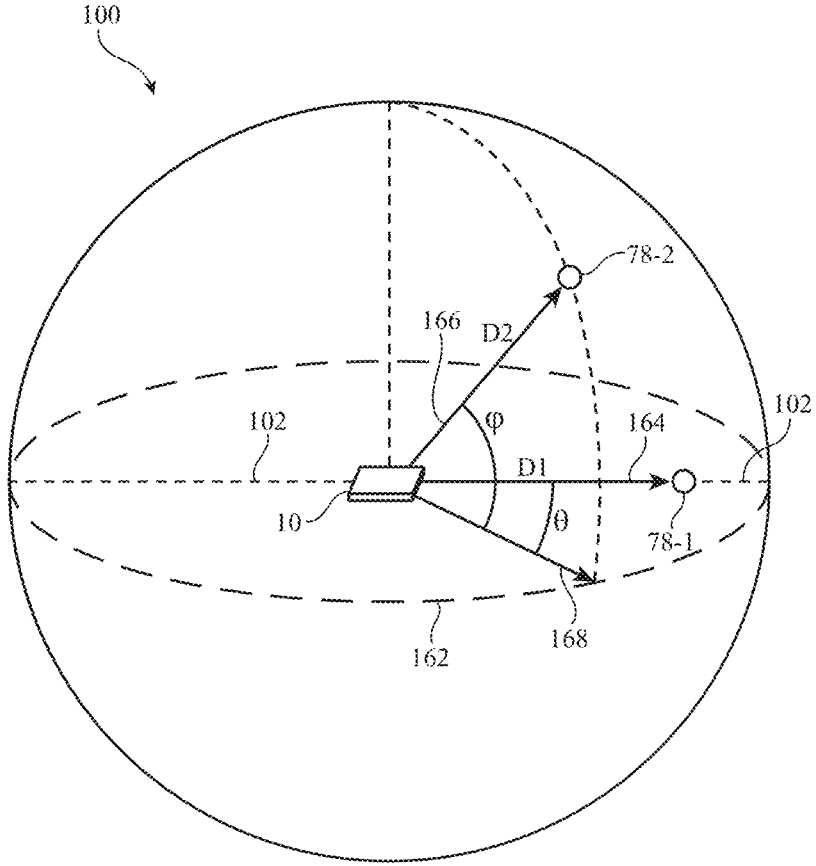
FIG. 16 is a diagram showing how a location and orientation of an illustrative electronic device relative to nodes in a network may be determined in accordance with an embodiment.

In addition to determining the distance between device 10 and nodes 78 in network 100, control circuitry 22 may be configured to determine the orientation of device 10 relative to nodes 78. FIG. 16 is a diagram showing how control circuitry 22 may use a horizontal coordinate system to define the position and orientation of device 10 relative to nearby nodes such as first node 78-1 and second node 78-2 may be determined. In this type of coordinate system, control circuitry 22 may determine an azimuth angle $\theta$ and elevation angle $\phi$ to describe the position of nearby nodes 78 relative to device 10. Control circuitry 22 may define a reference plane such as local horizon 162 and a reference vector such as reference vector 164. Local horizon 162 may be a plane that intersects device 10 and that is defined relative to a surface of device 10. For example, local horizon 162 may be a plane that is parallel to or coplanar with display 14 of device 10. Reference vector 164 (sometimes referred to as the "north" direction) may be a vector in local horizon 162. If desired, reference vector 164 may be aligned with longitudinal axis 102 of device 10 (e.g., an axis running lengthwise down the center of device 10). When reference vector 164 is aligned with longitudinal axis 102 of device 10, reference vector 164 may correspond to the direction in which device 10 is being pointed.

Azimuth angle $\theta$ and elevation angle $\phi$ may be measured relative to local horizon 162 and reference vector 164. As shown in FIG. 16, the elevation angle $\phi$ (sometimes referred to as altitude) of node 78-2 is the angle between node 78-2 and device 10's local horizon 162 (e.g., the angle between vector 166 extending between device 10 and node 78-2 and a coplanar vector 168 extending between device 10 and horizon 162). The azimuth angle $\theta$ of node 78-2 is the angle of node 78-2 around local horizon 162 (e.g., the angle between reference vector 164 and vector 168).

In the example of FIG. 16, the azimuth angle and elevation angle of node 78-1 are both 0° because node 78-1 is located in the line of sight of device 10 (e.g., node 78-1 intersects with reference vector 164 and horizontal plane 162). The azimuth angle $\theta$ and elevation angle $\phi$ of node 78-2, on the other hand, is greater than 0°. Control circuitry 22 may use a threshold azimuth angle and/or a threshold elevation angle to determine whether a nearby node is sufficiently close to the line of sight of device 10 to trigger appropriate action. As described below in connection with FIG. 17, control circuitry 22 may combine angle of arrival antenna measurements with motion sensor data to determine the azimuth angle θ and elevation angle φ of nearby nodes such as nodes 78-1 and 78-2.

Control circuitry 22 may also determine the proximity of nearby nodes 78 relative to device 10. As shown in FIG. 16, for example, control circuitry 22 may determine that node 78-1 is a distance D1 from device 10 and that node 78-2 is a distance D2 from device 10. Control circuitry 22 may determine proximity information using methods of the type described in connection with FIG. 15. For example, control circuitry 22 may determine proximity using wireless communications signals (e.g., signals 58 of FIG. 14), using distance sensors (e.g., infrared proximity sensors, structured light depth sensors, stereoscopic sensors, or other distance sensors), using motion sensor data from motion sensors 32 (e.g., data from an accelerometer, a gyroscope, a compass, or other suitable motion sensor), using image data from camera 30, and/or using other circuitry in device 10. Control circuitry 22 may use a threshold distance. If desired, other axes besides longitudinal axis 102 may be used as reference vector 164. For example, control circuitry 22 may use a horizontal axis that is perpendicular to longitudinal axis 102 as reference vector 164. This may be useful in determining when nodes 78 are located next to a side portion of device 10 (e.g., when device 10 is oriented side-to-side with one of nodes 78).

After determining the orientation of device 10 relative to nodes 78-1 and 78-2, control circuitry 22 may take suitable action. For example, in response to determining that node 78-1 is in the line of sight of device 10 and/or within a given range of device 10, control circuitry 22 may send information to node 78-1, may request and/or receive information from 78-1, may use display 14 to display a visual indication of wireless pairing with node 78-1, may use speakers 34 to generate an audio indication of wireless pairing with node 78-1, may use a vibrator, a haptic actuator, or other mechanical element to generate haptic output indicating wireless pairing with node 78-1, and/or may take other suitable action.

In response to determining that node 78-2 is located at azimuth angle θ, elevation angle q, and distance D2, relative to device 10, control circuitry 22 may use display 14 to display a visual indication of the location of node 78-2 relative to device 10, may use speakers 34 to generate an audio indication of the location of node 78-2, may use haptic components 60 to generate haptic output indicating the location of node 78-2, and/or may take other suitable action.

Figure 17:
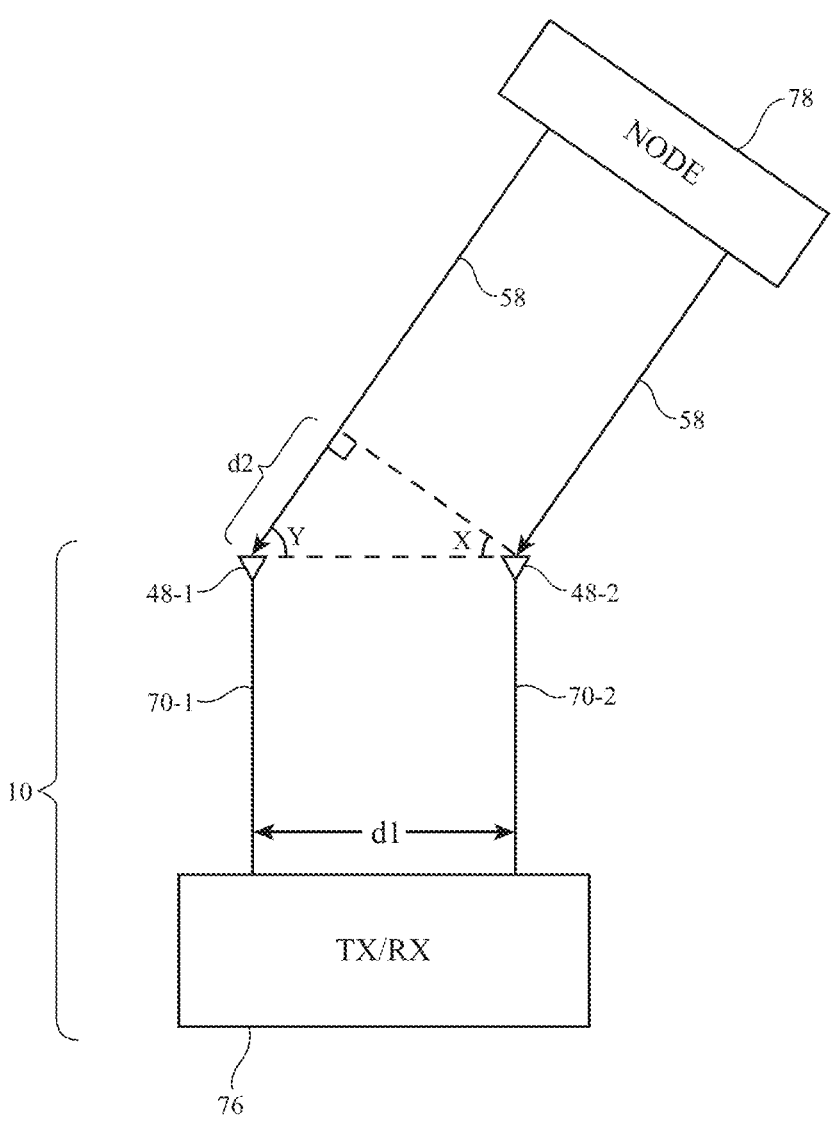
FIG. 17 is a diagram showing how angle of arrival antenna measurements may be used to determine the location of a node relative to an electronic device in accordance with an embodiment.

FIG. 17 is a schematic diagram showing how angle of arrival measurement techniques may be used to determine the orientation of device 10 relative to nodes 78. As shown in FIG. 17, electronic device 10 may include multiple antennas (e.g., a first antenna 48-1 and a second antenna 48-2) coupled to transceiver circuitry 76 by respective transmission lines 70 (e.g., a first transmission line 70-1 and a second transmission line 70-2). Antennas 48-1 and 48-2 may each receive a wireless signal 58 from node 78. Antennas 48-1 and 48-2 may be laterally separated by a distance d1, where antenna 48-1 is farther away from node 78 than 48-2 (in the example of FIG. 17). Therefore, wireless communications signal 58 travels a greater distance to reach antenna 48-1 than 48-2. The additional distance between node 78 and antenna 48-1 is shown in FIG. 17 as distance d2. FIG. 17 also shows angles x and y (where x+y=) 90°.

Distance d2 may be determined as a function of angle y or angle x (e.g., $d2=d1 \sin (x)$ or $d2=d1 \cos (y)$). Distance d2 may also be determined as a function of the phase difference between the signal received by antenna 48-1 and the signal received by antenna 48-2 (e.g., $d2=(\Delta\phi\lambda)/(2\pi)$, where $\Delta\phi$ is the phase difference between the signal received by antenna 48-1 and the signal received by antenna 48-2 and $\lambda$ is the wavelength of the received signal 58). Electronic device 10 may have phase measurement circuitry coupled to each antenna to measure the phase of the received signals and identify a difference in the phases ($\Delta\phi$). The two equations for d2 may be set equal to each other (e.g., $d1 \sin (x)=(\Delta\phi\lambda)/(2\pi)$) and rearranged to solve for angle x (e.g., $x=\sin^{-1} ((\Delta\phi\lambda)/(2\pi d1))$) or may be rearranged to solve for angle y. As such, the angle of arrival may be determined (e.g., by control circuitry 22) based on the known (predetermined) distance between antennas 48-1 and 48-2, the detected (measured) phase difference between the signal received by antenna 48-1 and the signal received by antenna 48-2, and the known wavelength or frequency of the received signals 58.

Distance d1 may be selected to ease the calculation for phase difference between the signal received by antenna 48-1 and the signal received by antenna 48-2. For example, d1 may be less than or equal to one half of the wavelength (e.g., effective wavelength) of the received signal 58 (e.g., to avoid multiple phase difference solutions).

Control circuitry 22 may control input-output devices such as touch input components 82 and haptic output components 60 of FIG. 2 based on the location of node 78 relative to device 10. For example, in response to determining that device 10 is being pointed at an object such as node 78, control circuitry 22 may activate some touch input components 82 and haptic components 60 (e.g., may place some touch input components 82 and haptic output components 60 in active mode in which components 82 and 60 are responsive to touch input) while inactivating other touch input components 82 and haptic components 60 (e.g., placing other touch input components 82 and haptic components 60 in inactive mode in which components 82 and 60 are nonresponsive to touch input). When haptic output component 60 is inactive, the user may not feel a click sensation when he or she taps or presses touch input component 82. This lets the user know that touch input component 82 is not actively processing touch input (e.g., such that touch input to component 82 does not result in signals being sent to node 78). When haptic output component 60 is active, the user feels haptic feedback when he or she provides touch input to components 82, thus letting the user know that the touch input is being processed and that corresponding signals are being sent to node 78. Control circuitry 22 may also control the function associated with touch input components 82 based on what object device 10 is controlling or communicating with.

Figure 18:
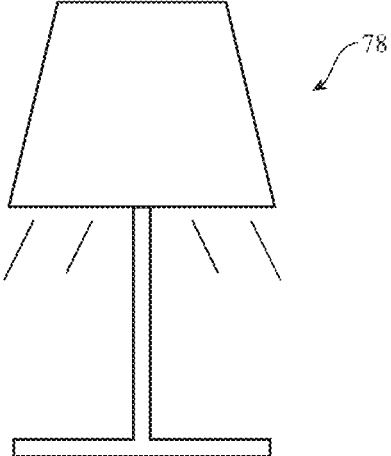
FIG. 18 is a diagram illustrating how input-output devices may be used to gather user input and provide haptic output to control an object such as a lamp in accordance with an embodiment.
Figure 18:
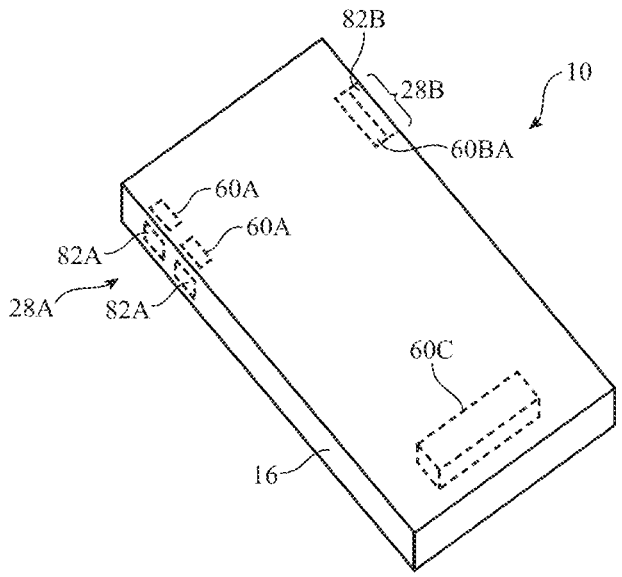

FIG. 18 shows an illustrative example in which device 10 is pointed towards an object such as node 78. In the example of FIG. 18, node 78 is a lamp and device 10 is used to control the brightness of light emitted from lamp 78. This is, however, merely illustrative. Node 78 may be any suitable device or object (e.g., television, a set-top box, a speaker, a tablet, cellular telephone, or other electronic equipment, a refrigerator, fan, a security system, or other household device, etc.) and device 10 may be used to control any suitable characteristic of node 78 (e.g., volume, display brightness, operating mode, audio track selection, scrolling through or otherwise manipulating an on-screen menu, etc.).

Device 10 may have different input-output regions such as regions 28A and 28B. Region 28A on the left side of device 10 may include input-output devices such as left touch input components 82A and left haptic output components 60A. Region 28B on the right side of device 10 may include input-output devices such as right touch input component 82B and right haptic output component 60B. Left haptic output components 60A may provide haptic output that is localized to the left side of device 10 and right haptic output components 60B may provide haptic output that is localized to the right side of device 10. Other haptic components such as haptic component 60C may be used to provide global haptic output (e.g., haptic output that is felt all over device 10). If desired, there may be two or more touch input components 82A on the left and/or right side of device 10 and control circuitry 22 may assign a different function to each touch-sensitive area (e.g., depending on what node 78 is being controlled or communicated with). In the example of FIG. 18, there are two separate touch input components 82A on the left side of device 10 and one touch input component 82B on the right side of device 10. This is merely illustrative, however. In general, there may be any suitable number of touch-sensitive areas and local haptic output areas on sidewalls 16 of device 10 and/or other areas of device 10.

The arrangement of FIG. 18 in which haptic output components 60A and 60B overlap touch input components 82A and 82B is merely illustrative. If desired, local haptic feedback may be provided in regions 82A and 82B from a haptic output component in a remote location such as haptic output component 60C. Arrangements in which local haptic feedback is provided by haptic output components 60A and 60B that overlap touch input components 82A and 82B are sometimes described herein as an illustrative example.

Control circuitry 22 may gather information about node 78 (e.g., based on received signals 58 from node 78, based on information about node 78 that is stored in device 10, based on the location of node 78, etc.). This may include information about what type of device node 78 is, what its communications capabilities are, and what functions it performs. When control circuitry 22 determines that device 10 is being pointed at node 78 and also determines what node 78 is, control circuitry 22 may activate certain input-output devices that may be used to interact with node 78 while inactivating other input-output devices that are not used to interact with node 78. For example, regions 28A may be active and region 28B may be inactive. When haptic components 60B are inactive, the user may not feel a "click" when his or her finger presses on region 28B of housing 12. This informs the user that right touch input component 82B is not the appropriate place to provide touch input to control lamp 78. In active region 28A, however, haptic components 60A may output a localized click when a user presses on one of touch input components 82A. Control circuitry 22 may assign user input functions to each touch input component 82 based on the information gathered about node 78. In the example of FIG. 18, control circuitry 22 assigns a brightness control function to touch input components 82A for controlling the brightness of lamp 78. One left touch input component 82A may be used to increase the brightness of lamp 78 and the other left touch input component 82A may be used to decrease the brightness of lamp 78. This example is merely illustrative. If desired, both left region 28A and right region 28B may be active for controlling device 78. For example, left touch input components 82A may be used to control the brightness of lamp 78 and right touch input components 82B may be used to power lamp 78 on and off.

Figure 19:
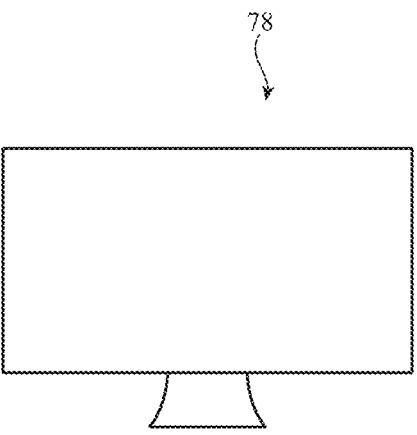
FIG. 19 is a diagram illustrating how input-output devices may be used to gather user input and provide haptic output to control an object such as a television in accordance with an embodiment.
Figure 19:
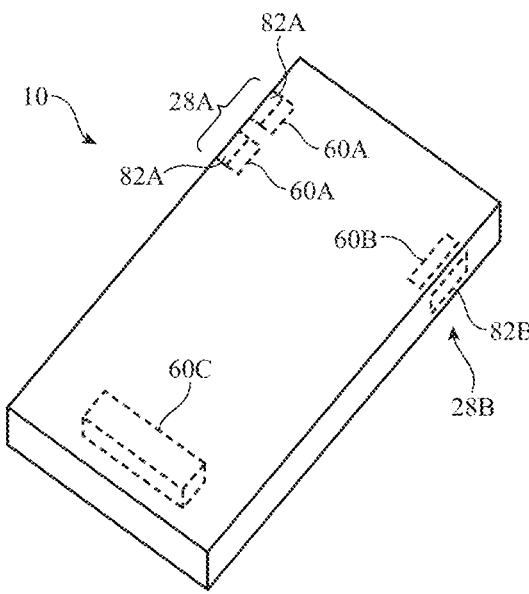

FIG. 19 illustrates an example in which device 10 is being pointed towards a node such as a television. Television 78 may have various characteristics that can be controlled using device 10. Upon determining that device 10 is pointed towards television 78, control circuitry 22 may assign certain functions to touch input components 82A and 82B. For example, left touch input components 82A may be used to navigate an on-screen menu or to control the volume, channel, brightness, or other characteristic of television 78, and right touch input components 82B may be used to power television 78 on and off.

Figure 20:
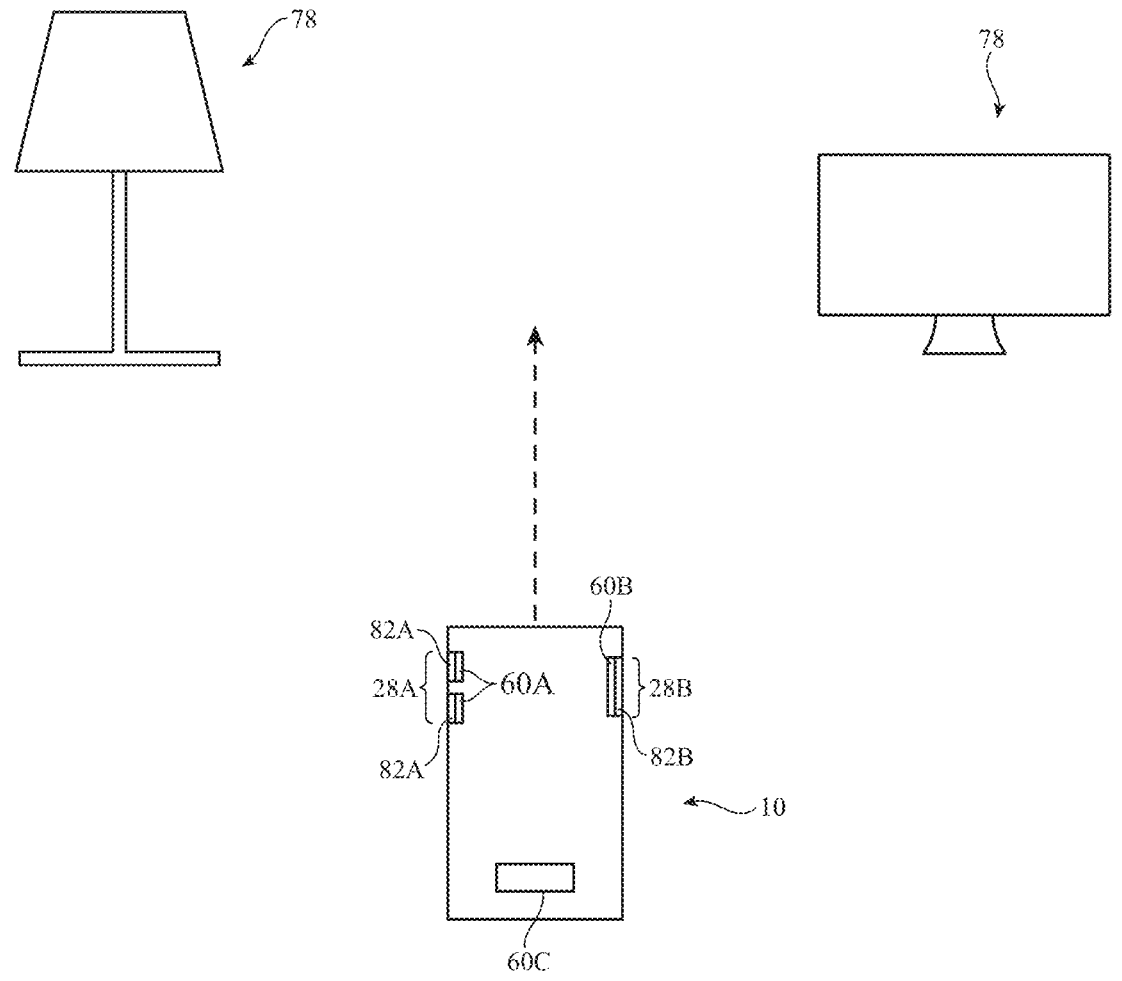
FIG. 20 is a diagram illustrating how input-output devices may be inactivated when an electronic device is not being used to control or communicate with external devices in accordance with embodiment.

FIG. 20 illustrates an example in which device 10 is not pointed towards an object that can be controlled or communicated with. This may be because various nodes 78 (e.g., a lamp, television, or other node) are within range but device 10 is not being pointed towards any one node 78, or because there are no nodes 78 within range of device 10. In this type of scenario, device 10 may inactivate both left region 28A and right region 28B. When inactive, touch input components 82A and 82B and haptic output components 60A and 60B are not responsive to touch input. The lack of haptic output in regions 28A and 28B and apparent inability to "click" regions 28A and 28B lets the user know that nothing is being controlled with touch input components 82A and 82B.

Figure 21:
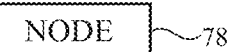
FIG. 21 is a diagram illustrating how haptic output components on a right side of an electronic device may provide localized haptic output to guide a user to an object in accordance with an embodiment.
Figure 21:
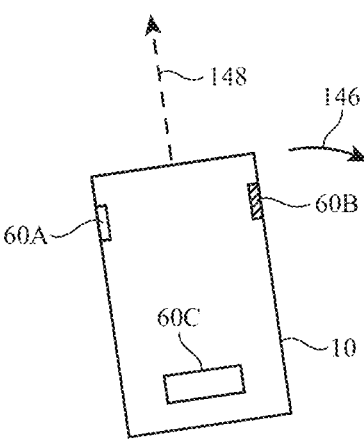
Figure 22:
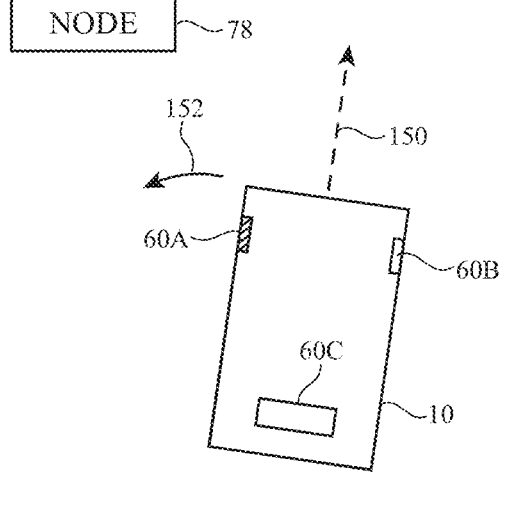
FIG. 22 is a diagram illustrating how haptic output components on a left side of an electronic device may provide localized haptic output to guide a user to an object in accordance with an embodiment.
Figure 23:
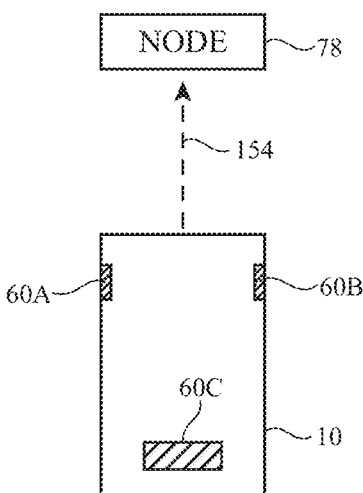
FIG. 23 is a diagram illustrating how haptic output components may provide global haptic output to indicate a connection to an object in accordance with an embodiment.

FIGS. 21, 22, and 23 illustrate an example in which haptic output components 60 are used to guide a user to a node. Control circuitry 22 may use one or more haptic output components 60 to suggest to a user that device 10 should be moved to the right, left, up, down, or other direction to connect with node 78. The haptic output may be a simple vibration on a particular side of device 10 or the haptic output may give the user a sensation of a gentle push or pull towards the appropriate direction.

In FIG. 21, device 10 is pointed in direction 148, which is too far to the left of node 78 to establish a connection. Control circuitry 22 may provide haptic output with right haptic component 60B to indicate that device 10 should be moved to the right in direction 146.

In FIG. 22, device 10 is pointed in direction 150, which is too far to the right of node 78 to establish a connection. Control circuitry 22 may provide haptic output with left haptic component 60A to indicate that device 10 should be moved to the left in direction 152.

In FIG. 23, device 10 is pointed in direction 154, which is sufficiently close to node 78 to establish a connection. Upon determining that device 10 is properly pointed at node 78, control circuitry 22 may provide output via one or more input-output devices to let the user know that node 78 is within range. For example, control circuitry 22 may provide global haptic output (e.g., using global haptic output component 60C and/or using a combination of left and right haptic output components 60A and 60B).

In addition to assigning different functions to different touch-sensitive regions 28, control circuitry 22 may also assign different functions to different force levels applied at each touch-sensitive region 28. A light force (e.g., a finger tap) on touch input components 82 may result in a small haptic vibration from haptic component 60 and a first control function for node 78 (e.g., volume control or other control function), whereas a harder force (e.g., a finger press) on touch input components 82 may result in a substantial haptic click sensation and a second control function for node 78 (e.g., power on or off or other control function).

Figure 24:
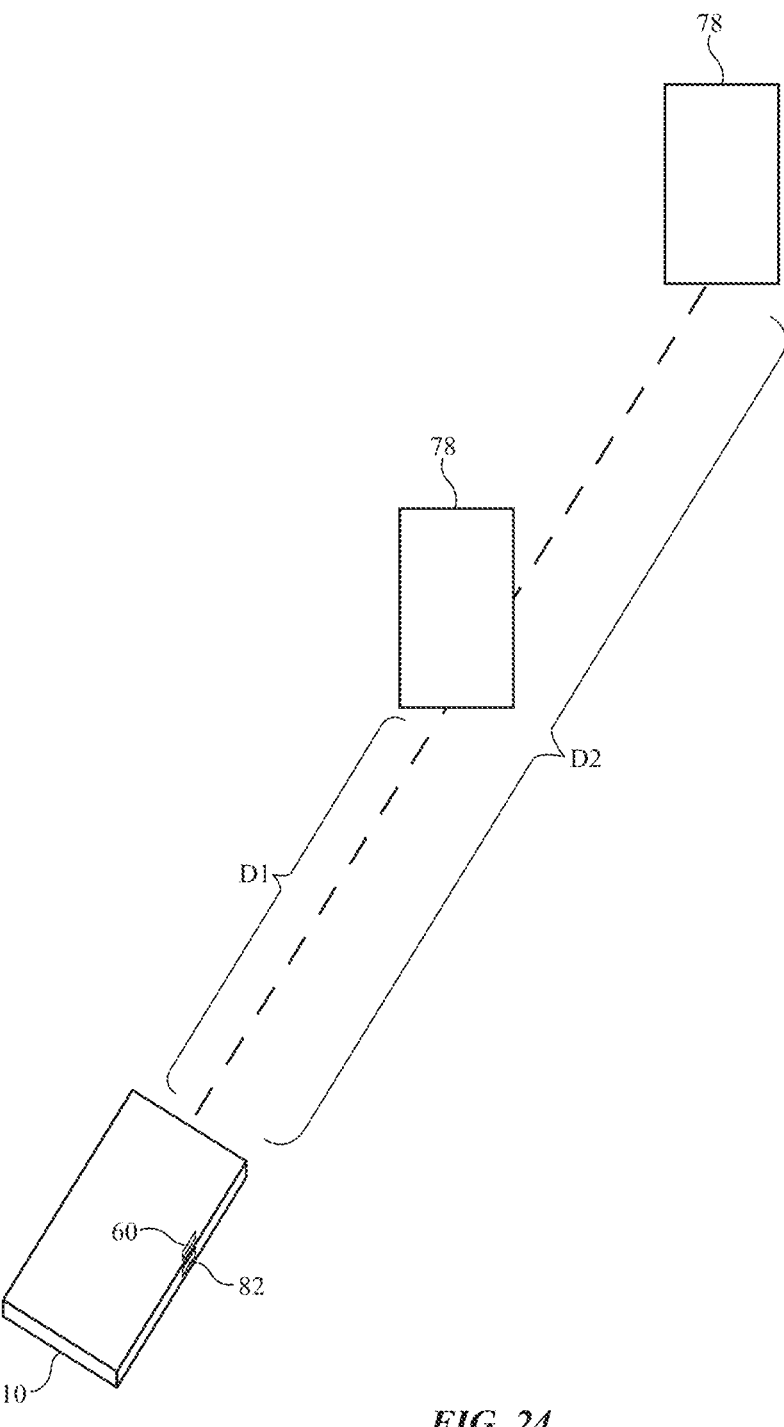
FIG. 24 is a diagram illustrating how an electronic device may select which object or device to communicate with based on the force of user input in accordance with an embodiment.

FIG. 24 illustrates an example in which control circuitry 22 selects which node 78 to connect to based on the force of touch input on touch input component 82. This may be useful in situations where device 10 is pointed towards two nodes (e.g., where angle of arrival is insufficient on its own to determine which node 78 is the intended target). As shown in FIG. 24, one node 78 may be located a distance D1 from device 10 and another node 78 may be located a distance D2 from device 10, with D2 being greater than D1. A light force on touch input component 82 may indicate that the user wishes to connect with the closer node 78 at distance D1, whereas a harder force on touch input component 82 may indicate that the user wishes to connect to the farther node 78 at distance D2. If desired, the haptic output from component 60 may also be adjusted based on the force of touch input on touch input component 82 so that the user knows when device 10 registers a harder finger press versus a light finger tap.

FIGS. 25 and 26 illustrate how control circuitry may take the orientation of device 10 into account when determining which touch input components 82 perform which functions and which haptic output devices 60 are selected to provide haptic output.

In the example of FIG. 25, device 10 is in an upright position where the top edge of device 10 is pointed in the positive Z direction. In this arrangement, left haptic output components 60A may be activated to guide a user to node 78 to the left of device 10. In the example of FIG. 26, device 10 is in an upside down configuration. Thus, to guide a user to node 78 to the left of device 10, control circuitry may use right haptic output components 60B.

FIGS. 27, 28, and 29 illustrate how drive signals that are applied to haptic output components 60 may be varied to inform the user of different events and/or to provide different types of information to the user. Curve 160 represents the drive signal I applied to haptic output component 60A, curve 162 represents the drive signal I applied to haptic output component 60B, and curve 164 represents the drive signal I applied to haptic output component 60C.

In FIG. 27, device 10 is in search mode in which device 10 is searching for nodes 78. When node 78 is to the left of device 10, control circuitry 22 applies a drive signal with magnitude L1 (curve 160) to left haptic component 60A to guide a user in direction 158. When node 78 is to the right of device 10, control circuitry 22 applies a drive signal with magnitude L1 (curve 162) to right haptic component 60B.

In FIG. 28, device 10 has been pointed towards node 78 and control circuitry 22 may use haptic output components 60 to notify the user that node 78 has been "found." This may include, for example, a global vibration of device 10 using haptic output component 60C. Control circuitry 22 may apply a drive signal with magnitude L2 (curve 164) to haptic component 60C. L2 may be the same as L1, may be greater than L1, or may be less than L1.

In FIG. 29, control circuitry 22 may use haptic output components 60A, 60B, and/or 60C to provide haptic output associated with a selection of node 78. For example, upon "finding" device 10 (FIG. 28), a user may provide input (touch input, motion input, voice input, or other input) indicating that he or she wishes to control node 78, send information to node 78, or receive information from node 78. In other scenarios, simply pointing device 10 at node 78 for a predetermined period of time may indicate a desire to control or communicate with node 78. In response, control circuitry 22 may provide haptic output that lets the user know node 78 has been selected. By effectively "latching on" to node 78, the user can proceed to control or communicate with node 78 without needing to keep device 10 directly pointed at node 78. In the example of FIG. 29, control circuitry 22 applies a drive signal of magnitude L3 to haptic components 60A, 60B, and 60C. L3 may be the same as L1 or L2, may be greater than L1 or L2, or may be less than L1 or L2. This is merely illustrative, however. If desired, haptic output component 60C may be used on its own to provide global haptic output indicating a selection of (or latching on to) node 78. Small bursts or pulses of haptic output from components 60A and/or 60B may be used to let the user know which touch input components 82 may be used to control or communicate with node 78.

The foregoing is merely illustrative and various modifications can be made to the described embodiments. The foregoing embodiments may be implemented individually or in any combination.

What is claimed is:

1. An electronic device, comprising:
an input device configured to receive touch input;
wireless communications circuitry configured to:
    determine whether a pointing direction of the electronic device is aligned with a first external electronic device or a second external electronic device,
    send first control signals to the first external electronic device in response to the touch input when the pointing direction is aligned with the first external electronic device, and
    send second control signals to the second external electronic device in response to the touch input when the pointing direction is aligned with the second external electronic device; and
a haptic output device configured to:
    provide first haptic output when the pointing direction is aligned with the first external electronic device, and
    provide second haptic output when the pointing direction is aligned with the second external electronic device, wherein the first haptic output is different from the second haptic output, and wherein the haptic output device is configured to provide no haptic output in response to the touch input when the pointing direction is not aligned with the first or second external electronic device.

2. The electronic device defined in claim 1 wherein the first external electronic device comprises a speaker and wherein the first control signals are configured to adjust a volume of audio output from the speaker.

3. The electronic device defined in claim 2 wherein the second external electronic device comprises a display and wherein the second control signals are configured to adjust a brightness of the display.

4. The electronic device defined in claim 1 further comprising a motion sensor configured to gather motion data, wherein the pointing direction is determined at least partly based on the motion data.

5. The electronic device defined in claim 1 wherein the input device is selected from the group consisting of: a mechanical button and a touch sensor.

6. The electronic device defined in claim 1 wherein the wireless communications circuitry comprises ultra-wideband communications circuitry configured to receive ultra-wideband signals from the first and second external electronic devices.

7. The electronic device defined in claim 6 wherein the wireless communications circuitry is configured to determine an angle of arrival of the ultra-wideband signals.

8. The electronic device defined in claim 7 wherein the wireless communications circuitry is configured to determine the pointing direction based on the angle of arrival of the ultra-wideband signals.

9. The electronic device defined in claim 1 wherein the input device comprises first and second buttons and wherein different functions are assigned to the first and second buttons based on whether the pointing direction is aligned with the first or second external electronic device.

10. An electronic device, comprising:

wireless communications circuitry configured to receive signals from an external electronic device and to determine an angle between the electronic device and the external electronic device based on the signals;

an input device configured to receive touch input, wherein the wireless communications circuitry is configured to send control signals to the external electronic device when the angle is less than a threshold angle; and a haptic output device configured to provide haptic output in response to the touch input when the angle is less than the threshold angle and configured to provide no haptic output in response to the touch input when the angle is greater than the threshold angle.

11. The electronic device defined in claim 10 wherein the wireless communications circuitry comprises ultra-wideband communications circuitry and the signals comprise ultra-wideband signals.

12. The electronic device defined in claim 11 wherein the wireless communications circuitry is configured to determine an angle of arrival of the ultra-wideband signals and to determine the angle based on the angle of arrival.

13. The electronic device defined in claim 10 wherein the input device is selected from the group consisting of: a mechanical button and a touch sensor.

14. The electronic device defined in claim 10 wherein the signals include information about the external electronic device and wherein a function of the input device is adjusted based on the information about the external electronic device.

15. An electronic device, comprising:

ultra-wideband transceiver circuitry configured to determine an angle of arrival of ultra-wideband signals received from an external electronic device;

a motion sensor configured to gather motion data, wherein a pointing direction of the electronic device is determined based on the angle of arrival and the motion data;

an input device configured to receive touch input, wherein a function of the input device is adjusted based on the pointing direction of the electronic device; and a haptic output device configured to provide haptic output in response to the touch input, wherein the haptic output is adjusted based on the pointing direction of the electronic device.

16. The electronic device defined in claim 15 wherein the motion sensor comprises at least one of: an accelerometer, a gyroscope, and a compass.

17. The electronic device defined in claim 15 wherein the haptic output is adjusted between localized haptic output and global haptic output.

18. The electronic device defined in claim 15 wherein the function of the input device is adjusted between a brightness control function and a volume control function.

19. The electronic device defined in claim 15 wherein the haptic output device is configured to provide no haptic output in response to the touch input when the pointing direction is not aligned with the external electronic device.

* * * * *